(12) United States Patent
Akl et al.

(10) Patent No.: US 11,284,332 B2
(45) Date of Patent: Mar. 22, 2022

(54) NETWORK CODING IN AN INTEGRATED ACCESS AND BACKHAUL NETWORK

(71) Applicant: QUALCOMM Incorporated, San Diego, CA (US)

(72) Inventors: Naeem Akl, Somerville, NJ (US); Karl Georg Hampel, Hoboken, NJ (US); Navid Abedini, Somerset, NJ (US); Jianghong Luo, Skillman, NJ (US); Junyi Li, Chester, NJ (US); Luca Blessent, Whitehouse Station, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/071,238

(22) Filed: Oct. 15, 2020

(65) Prior Publication Data

US 2021/0120478 A1  Apr. 22, 2021

Related U.S. Application Data

(60) Provisional application No. 62/923,148, filed on Oct. 18, 2019.

(51) Int. Cl.
*H04W 40/30* (2009.01)
*H04W 76/11* (2018.01)

(52) U.S. Cl.
CPC ............ *H04W 40/30* (2013.01); *H04W 76/11* (2018.02)

(58) Field of Classification Search
None
See application file for complete search history.

(56) References Cited

U.S. PATENT DOCUMENTS

2021/0058826 A1\* 2/2021 Mao .................. H04W 28/0933

FOREIGN PATENT DOCUMENTS

WO   WO-2020222196 A1 \* 11/2020 ............ H04W 76/11

OTHER PUBLICATIONS

\*Citation part 1 of 2\*—Intel Corporation: "Network Coding For Release 17 IAB", 3GPP Draft, 3GPP TSG RAN Meeting #85, RP-192206 Network Coding for IAB, 3rd Generation Partnership Project (3GPP), Mobile Competence Centre, 650.

(Continued)

*Primary Examiner* — Brian S Roberts
(74) *Attorney, Agent, or Firm* — Harrity & Harrity LLP/Qualcomm Incorporated

(57) ABSTRACT

In some aspects, a network node may determine a connection identifier associated with transmitting data to a decoder node via multiple paths, wherein the connection identifier is associated with a single radio bearer of a user equipment (UE); encode a first portion of data into first packets and second packets; transmit the first packets and the connection identifier to the decoder node via a first path; transmit the second packets and the connection identifier to the decoder node via a second path; receive a response from the decoder node, wherein the response includes the connection identifier; and transmit, to the decoder node and based at least in part on the response, one of: third packets, encoded from the first portion of data, and the connection identifier, or one or more sets of packets, encoded from a second portion of data, and the connection identifier.

30 Claims, 13 Drawing Sheets

(56) References Cited

OTHER PUBLICATIONS

*Citation part 2 of 2*—Route Des Lucioles, F-06921 Sophia-Antipolis Cedex, France, vol. TSG RAN. No. Newport Beach. U.S.A, Sep. 16, 2019-Sep. 20, 2019, Sep. 15, 2019 (Sep. 15, 2019), XP051779435, 9 Pages, Retrieved from the Internet: URL: http://www.3gpp.org/ftp/Meetings_3GPP_SYNC/RAN/Docs/RP-192206.zip. [retrieved on Sep. 15, 2019] p. 1-p. 7 figures 1-6.
International Search Report and Written Opinion—PCT/US2020/055973—ISA/EPO—dated Feb. 8, 2021.
*Citation part 1 of 2*—KDDI Corporation: "Open Issues for BAP-Layer Bearer Mapping", 3GPP Draft, 3GPP TSG-RAN WG2 Meeting #106, R2-1906084, KDDI IAB Bearer mapping Open issues, 3rd Generation Partnership Project (3GPP), Mobile.
*Citation part 2 of 2*—Competence Centre, 650, Route Des Lucioles, F-06921 Sophia-Antipolis Cedex, France, vol. RAN WG2. No. Reno, USA, May 13, 2019-May 17, 2019, May 13, 2019 (May 13, 2019), XP051729561, 4 Pages, Retrieved from the Internet: URL: http://www.3gpp.org/ftp/Meetings%5F3GPP%5FSYNC/RAN2/Docs/R2%2D1906084%2Ezip. [retrieved on May 13, 2019] Sections 1-2; p. 1-p. 3 table 1.
*Citation part 1 of 2*—ZTE Corporation: et al., "Consideration on UL Lossless Delivery in IAB", 3GPP Draft, 3GPP TSG RAN WG2 Meeting #106, R2-1906569, Consideration on UL Lossless Delivery in IAB, 3rd Generation Partnership Project.
*Citation part 2 of 2*—(3GPP), Mobile Competence Centre, 650, Route Des Lucioles, F-06921 Sophia-Antipolis Cedex, France, vol. RAN WG2. No. Reno, USA, May 13, 2019-May 17, 2019, May 13, 2019 (May 13, 2019), XP051730030,4 Pages, Retrieved from the Internet: URL: http://www.3gpp.org/ftp/Meetings%5F3GPP%5FSYNC/RAN2/Docs/R2%2D1906569%2Ezip. [retrieved on May 13, 2019] p. 3.

* cited by examiner

NETWORK CODING IN AN INTEGRATED ACCESS AND BACKHAUL NETWORK

CROSS-REFERENCE TO RELATED APPLICATION

This Patent Application claims priority to U.S. Provisional Patent Application No. 62/923,148, filed on Oct. 18, 2019, entitled "NETWORK CODING IN AN INTEGRATED ACCESS AND BACKHAUL NETWORK," and assigned to the assignee hereof. The disclosure of the prior Application is considered part of and is incorporated by reference in this Patent Application.

FIELD OF THE DISCLOSURE

Aspects of the present disclosure generally relate to wireless communication and to techniques and apparatuses for network coding in an integrated access and backhaul network.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a network node in a wireless multi-hop network, may include determining a connection identifier associated with transmitting data to a decoder node in the wireless multi-hop network via multiple paths, wherein the connection identifier is associated with a single radio bearer between a user equipment (UE) and one of the network node or the decoder node; encoding a first portion of the data into at least a first set of packets and a second set of packets; transmitting the first set of packets and the connection identifier to the decoder node via a first path in the wireless multi-hop network; transmitting the second set of packets and the connection identifier to the decoder node via a second path in the wireless multi-hop network; receiving a response from the decoder node, wherein the response includes the connection identifier; and transmitting, to the decoder node and based at least in part on the response, one of: a third set of packets, encoded from the first portion of the data, and the connection identifier, or one or more sets of packets, encoded from a second portion of the data, and the connection identifier.

In some aspects, a method of wireless communication, performed by a network node in a wireless multi-hop network, may include determining a connection identifier associated with receiving data from an encoder node in the wireless multi-hop network via multiple paths, wherein the connection identifier is associated with a single radio bearer between a UE and one of the network node or the encoder node; receiving a first set of packets and the connection identifier from the encoder node via a first path in the wireless multi-hop network; receiving a second set of packets and the connection identifier from the encoder node via a second path in the wireless multi-hop network; decoding a first portion of the data based at least in part on the first set of packets and the second set of packets; transmitting a response to the encoder node based at least in part on a result of the decoding, wherein the response includes the connection identifier; and receiving, from the encoder node and based at least in part on the response, one of: a third set of packets, encoded from the first portion of the data, and the connection identifier, or one or more sets of packets, encoded from a second portion of the data, and the connection identifier.

In some aspects, a network node for wireless communication may include memory and one or more processors operatively coupled to the memory. The memory and the one or more processors may be configured to determine a connection identifier associated with transmitting data to a decoder node in the wireless multi-hop network via multiple paths, wherein the connection identifier is associated with a single radio bearer between a UE and one of the network node or the decoder node; encode a first portion of the data into at least a first set of packets and a second set of packets; transmit the first set of packets and the connection identifier to the decoder node via a first path in the wireless multi-hop network; transmit the second set of packets and the connection identifier to the decoder node via a second path in the wireless multi-hop network; receive a response from the decoder node, wherein the response includes the connection identifier; and transmit, to the decoder node and based at least in part on the response, one of: a third set of packets, encoded from the first portion of the data, and the connection identifier, or one or more sets of packets, encoded from a second portion of the data, and the connection identifier.

In some aspects, a network node for wireless communication may include memory and one or more processors operatively coupled to the memory. The memory and the one or more processors may be configured to determine a connection identifier associated with receiving data from an encoder node in the wireless multi-hop network via multiple paths, wherein the connection identifier is associated with a single radio bearer between a UE and one of the network node or the encoder node; receive a first set of packets and the connection identifier from the encoder node via a first path in the wireless multi-hop network; receive a second set of packets and the connection identifier from the encoder node via a second path in the wireless multi-hop network; decode a first portion of the data based at least in part on the first set of packets and the second set of packets; transmit a response to the encoder node based at least in part on a result of the decoding, wherein the response includes the connection identifier; and receive, from the encoder node and based at least in part on the response, one of: a third set of packets, encoded from the first portion of the data, and the connection identifier, or one or more sets of packets, encoded from a second portion of the data, and the connection identifier.

In some aspects, a non-transitory computer-readable medium may store one or more instructions for wireless communication. The one or more instructions, when executed by one or more processors of a network node, may cause the one or more processors to: determine a connection identifier associated with transmitting data to a decoder node in the wireless multi-hop network via multiple paths, wherein the connection identifier is associated with a single radio bearer between a UE and one of the network node or the decoder node; encode a first portion of the data into at least a first set of packets and a second set of packets; transmit the first set of packets and the connection identifier to the decoder node via a first path in the wireless multi-hop network; transmit the second set of packets and the connection identifier to the decoder node via a second path in the wireless multi-hop network; receive a response from the decoder node, wherein the response includes the connection identifier; and transmit, to the decoder node and based at least in part on the response, one of: a third set of packets, encoded from the first portion of the data, and the connection identifier, or one or more sets of packets, encoded from a second portion of the data, and the connection identifier.

In some aspects, a non-transitory computer-readable medium may store one or more instructions for wireless communication. The one or more instructions, when executed by one or more processors of a network node, may cause the one or more processors to: determine a connection identifier associated with receiving data from an encoder node in the wireless multi-hop network via multiple paths, wherein the connection identifier is associated with a single radio bearer between a UE and one of the network node or the encoder node; receive a first set of packets and the connection identifier from the encoder node via a first path in the wireless multi-hop network; receive a second set of packets and the connection identifier from the encoder node via a second path in the wireless multi-hop network; decode a first portion of the data based at least in part on the first set of packets and the second set of packets; transmit a response to the encoder node based at least in part on a result of the decoding, wherein the response includes the connection identifier; and receive, from the encoder node and based at least in part on the response, one of: a third set of packets, encoded from the first portion of the data, and the connection identifier, or one or more sets of packets, encoded from a second portion of the data, and the connection identifier.

In some aspects, an apparatus for wireless communication may include means for determining a connection identifier associated with transmitting data to a decoder node in the wireless multi-hop network via multiple paths, wherein the connection identifier is associated with a single radio bearer between a UE and one of the apparatus or the decoder node; means for encoding a first portion of the data into at least a first set of packets and a second set of packets; means for transmitting the first set of packets and the connection identifier to the decoder node via a first path in the wireless multi-hop network; means for transmitting the second set of packets and the connection identifier to the decoder node via a second path in the wireless multi-hop network; means for receiving a response from the decoder node, wherein the response includes the connection identifier; and means for transmitting, to the decoder node and based at least in part on the response, one of: a third set of packets, encoded from the first portion of the data, and the connection identifier, or one or more sets of packets, encoded from a second portion of the data, and the connection identifier.

In some aspects, an apparatus for wireless communication may include means for determining a connection identifier associated with receiving data from an encoder node in the wireless multi-hop network via multiple paths, wherein the connection identifier is associated with a single radio bearer between a UE and one of the apparatus or the encoder node; means for receiving a first set of packets and the connection identifier from the encoder node via a first path in the wireless multi-hop network; means for receiving a second set of packets and the connection identifier from the encoder node via a second path in the wireless multi-hop network; means for decoding a first portion of the data based at least in part on the first set of packets and the second set of packets; means for transmitting a response to the encoder node based at least in part on a result of the decoding, wherein the response includes the connection identifier; and means for receiving, from the encoder node and based at least in part on the response, one of: a third set of packets, encoded from the first portion of the data, and the connection identifier, or one or more sets of packets, encoded from a second portion of the data, and the connection identifier.

Aspects generally include a method, apparatus, system, computer program product, non-transitory computer-readable medium, user equipment, base station, wireless communication device, network node, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
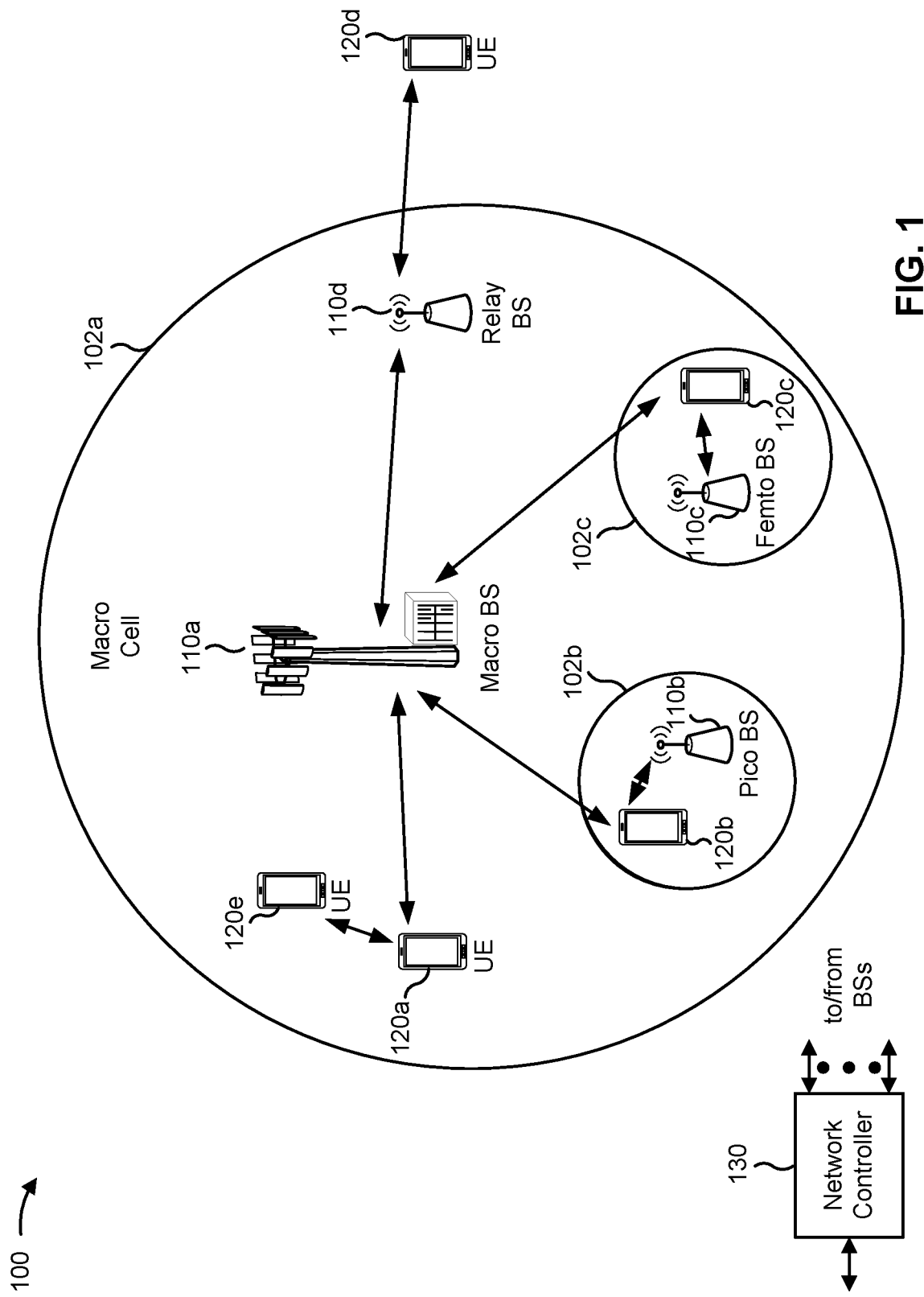
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110*a*, BS 110*b*, BS 110*c*, and BS 110*d*) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
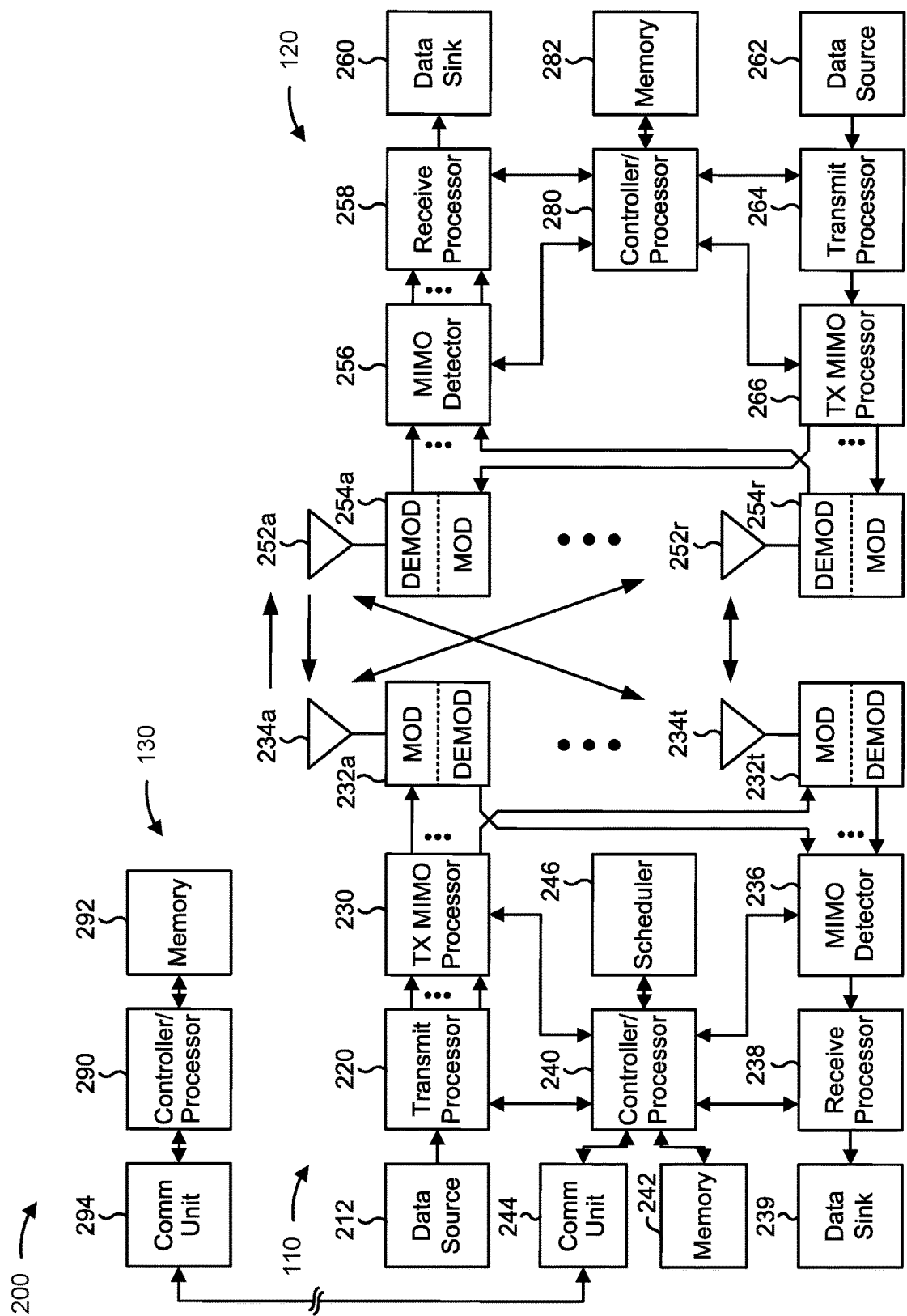
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, controller/processor 290 of network controller 130, and/or any other component(s) of FIG. 2 may perform one or more techniques associated with network coding in an integrated access and backhaul (IAB) network, as described in more detail elsewhere herein. For example, controller/processor 240 of base station 110, controller/processor 280 of UE 120, controller/processor 290 of network controller 130, and/or any other component(s) of FIG. 2 may perform or direct operations of, for example, process 1200 of FIG. 12, process 1300 of FIG. 13, and/or other processes as described herein. Memories 242, 282, and 292 may store data and program codes for base station 110, UE 120, and network controller 130, respectively. In some aspects, memory 242, memory 282, and/or memory 292 may comprise a non-transitory computer-readable medium storing one or more instructions for wireless communication. For example, the one or more instructions, when executed by one or more processors of the base station 110, the UE 120, and/or the network controller 130 may perform or direct operations of, for example, process 1200 of FIG. 12, process 1300 of FIG. 13, and/or other processes as described herein. A scheduler 246 may schedule UEs for data transmission on the downlink and/or uplink.

In some aspects, the components described in connection with network controller 130 and/or base station 110 may be included in a central unit (CU) of an IAB donor. Additionally, or alternatively, the components described in connection with base station 110 may be included in a distributed unit (DU) of an IAB donor and/or a DU of an IAB node. Additionally, or alternatively, the components described in connection with UE 120 may be included in a mobile termination (MT) of an IAB node.

In some aspects, a network node (e.g., an IAB node, an IAB donor, a UE 120, a base station 110, and/or the like) may include means for determining (e.g., using controller/processor 240, memory 242, communication unit 244, controller/processor 280, memory 282, controller/processor 290, memory 292, and/or the like) a connection identifier associated with transmitting data to a decoder node in the wireless multi-hop network via multiple paths, wherein the connection identifier is associated with a single radio bearer between a UE and one of the network node or the decoder node; means for encoding (e.g., using controller/processor 240, memory 242, communication unit 244, transmit processor 220, TX MIMO processor 230, MOD 232, antenna 234, controller/processor 280, memory 282, transmit processor 264, TX MIMO processor 266, MOD 254, antenna 252, controller/processor 290, memory 292, communication unit 294, and/or the like) a first portion of the data into at least a first set of packets and a second set of packets; means for transmitting (e.g., using controller/processor 240, memory 242, communication unit 244, transmit processor 220, TX MIMO processor 230, MOD 232, antenna 234, controller/processor 280, memory 282, transmit processor 264, TX MIMO processor 266, MOD 254, antenna 252, controller/processor 290, memory 292, communication unit 294, and/or the like) the first set of packets and the connection identifier to the decoder node via a first path in the wireless multi-hop network; means for transmitting (e.g., using controller/processor 240, memory 242, communication unit 244, transmit processor 220, TX MIMO processor 230, MOD 232, antenna 234, controller/processor 280, memory 282, transmit processor 264, TX MIMO processor 266, MOD 254, antenna 252, controller/processor 290, memory 292, communication unit 294, and/or the like) the second set of packets and the connection identifier to the decoder node via a second path in the wireless multi-hop network; means for receiving (e.g., using antenna 234, DEMOD 232, MIMO detector 236, receive processor 238, controller/processor 240, memory 242, communication unit 244, antenna 252, DEMOD 254, MIMO detector 256, receive processor 258, controller/processor 280, memory 282, controller/processor 290, memory 292, communication unit 294, and/or the like) a response from the decoder node, wherein the response includes the connection identifier; means for transmitting (e.g., using controller/processor 240, memory 242, communication unit 244, transmit processor 220, TX MIMO processor 230, MOD 232, antenna 234, controller/processor 280, memory 282, transmit processor 264, TX MIMO processor 266, MOD 254, antenna 252, controller/processor 290, memory 292, communication unit 294, and/or the like), to the decoder node and based at least in part on the response, one of: a third set of packets, encoded from the first portion of the data, and the connection identifier, or one or more sets of packets, encoded from a second portion of the data, and the connection identifier; and/or the like. In some aspects, such means may include one or more components of UE 120, base station 110, and/or network controller 130 described in connection with FIG. 2, such as controller/processor 240, memory 242, communication unit 244, transmit processor 220, TX MIMO processor 230, MOD 232, DEMOD 232, antenna 234, MIMO detector 236, receive processor 238, controller/processor 280, memory 282, transmit processor 264, TX MIMO processor 266, MOD 254, DEMOD 254, MIMO detector 256, receive processor 258, antenna 252, controller/processor 290, memory 292, communication unit 294, and/or the like.

Additionally, or alternatively, the network node (e.g., an IAB node, an IAB donor, a UE 120, a base station 110, and/or the like) may include means for determining (e.g., using controller/processor 240, memory 242, communication unit 244, controller/processor 280, memory 282, controller/processor 290, memory 292, and/or the like) a connection identifier associated with receiving data from an encoder node in the wireless multi-hop network via multiple paths, wherein the connection identifier is associated with a single radio bearer between a user equipment (UE) and one of the apparatus or the encoder node; means for receiving (e.g., using antenna 234, DEMOD 232, MIMO detector 236, receive processor 238, controller/processor 240, memory 242, communication unit 244, antenna 252, DEMOD 254, MIMO detector 256, receive processor 258, controller/processor 280, memory 282, controller/processor 290, memory 292, communication unit 294, and/or the like) a first set of packets and the connection identifier from the encoder node via a first path in the wireless multi-hop network; means for receiving (e.g., using antenna 234, DEMOD 232, MIMO detector 236, receive processor 238, controller/processor 240, memory 242, communication unit 244, antenna 252, DEMOD 254, MIMO detector 256, receive processor 258, controller/processor 280, memory 282, controller/processor 290, memory 292, communication unit 294, and/or the like) a second set of packets and the connection identifier from the encoder node via a second path in the wireless multi-hop network; means for decoding (e.g., using antenna 234, DEMOD 232, MIMO detector 236, receive processor 238, controller/processor 240, memory 242, communication unit 244, antenna 252, DEMOD 254, MIMO detector 256, receive processor 258, controller/processor 280, memory 282, controller/processor 290, memory 292, communication unit 294, and/or the like) a first portion of the data based at least in part on the first set of packets and the second set of packets; means for transmitting (e.g., using controller/processor 240, memory 242, communication unit 244, transmit processor 220, TX MIMO processor 230, MOD 232, antenna 234, controller/processor 280, memory 282, transmit processor 264, TX MIMO processor 266, MOD 254, antenna 252, controller/processor 290, memory 292, communication unit 294, and/or the like) a response to the encoder node based at least in part on a result of the decoding, wherein the response includes the connection identifier; means for receiving (e.g., using antenna 234, DEMOD 232, MIMO detector 236, receive processor 238, controller/processor 240, memory 242, communication unit 244, antenna 252, DEMOD 254, MIMO detector 256, receive processor 258, controller/processor 280, memory 282, controller/processor 290, memory 292, communication unit 294, and/or the like), from the encoder node and based at least in part on the response, one of: a third set of packets, encoded from the first portion of the data, and the connection identifier, or one or more sets of packets, encoded from a second portion of the data, and the connection identifier; and/or the like. In some aspects, such means may include one or more components of UE 120, base station 110, and/or network controller 130 described in connection with FIG. 2, such as controller/processor 240, memory 242, communication unit 244, transmit processor 220, TX MIMO processor 230, MOD 232, DEMOD 232, antenna 234, MIMO detector 236, receive processor 238, controller/processor 280, memory 282, transmit processor 264, TX MIMO processor 266, MOD 254, DEMOD 254, MIMO detector 256, receive processor 258, antenna 252, controller/processor 290, memory 292, communication unit 294, and/or the like.

As indicated above, FIG. 2 is provided as an example. Other examples may differ from what is described with regard to FIG. 2.

Figure 3:
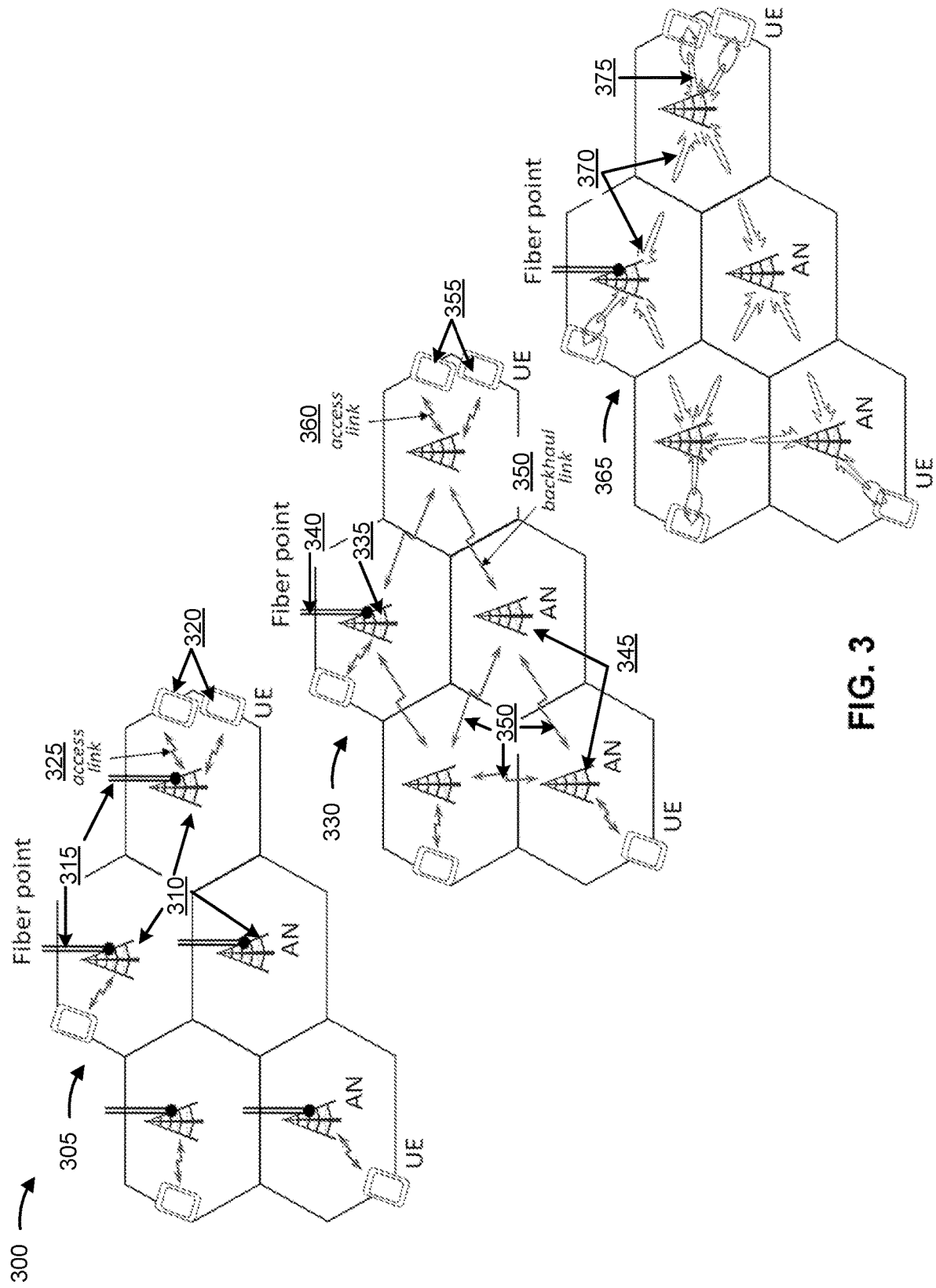
FIG. 3 is a diagram illustrating examples of radio access networks, in accordance with various aspects of the disclosure.

FIG. 3 is a diagram illustrating examples 300 of radio access networks, in accordance with various aspects of the disclosure.

As shown by reference number 305, a traditional (e.g., 3G, 4G, LTE, and/or the like) radio access network may include multiple base stations 310 (e.g., access nodes (AN)), where each base station 310 communicates with a core network via a wired backhaul link 315, such as a fiber connection. A base station 310 may communicate with a UE 320 via an access link 325, which may be a wireless link. In some aspects, a base station 310 shown in FIG. 3 may correspond to a base station 110 shown in FIG. 1. Similarly, a UE 320 shown in FIG. 3 may correspond to a UE 120 shown in FIG. 1.

As shown by reference number 330, a radio access network may include a wireless backhaul network, sometimes also referred to as an integrated access and backhaul (IAB) network. An IAB network is a type of wireless multi-hop network. In an IAB network, at least one base station is an anchor base station 335 that communicates with a core network via a wired backhaul link 340, such as a fiber connection. An anchor base station 335 may also be referred to as an IAB donor (or IAB-donor). The IAB network may include one or more non-anchor base stations 345, sometimes also referred to as relay base stations, IAB nodes (or IAB-nodes), and/or the like. The non-anchor base station 345 may communicate directly with or indirectly with (e.g., via one or more non-anchor base stations 345) the anchor base station 335 via one or more backhaul links 350 to form a backhaul path (or route) to the core network for carrying backhaul traffic. Backhaul link 350 may be a wireless link. Anchor base station(s) 335 and/or non-anchor base station(s) 345 may communicate with one or more UEs 355 via access links 360, which may be wireless links for carrying access traffic. In some aspects, an anchor base station 335 and/or a non-anchor base station 345 shown in FIG. 3 may correspond to a base station 110 shown in FIG. 1. Similarly, a UE 355 shown in FIG. 3 may correspond to a UE 120 shown in FIG. 1.

As shown by reference number 365, in some aspects, a radio access network that includes an IAB network may utilize millimeter wave technology and/or directional communications (e.g., beamforming, precoding and/or the like) for communications between base stations and/or UEs (e.g., between two base stations, between two UEs, and/or between a base station and a UE). For example, wireless backhaul links 370 between base stations may use millimeter waves to carry information and/or may be directed toward a target base station using beamforming, precoding, and/or the like. Similarly, the wireless access links 375 between a UE and a base station may use millimeter waves and/or may be directed toward a target wireless node (e.g., a UE and/or a base station). In this way, inter-link interference may be reduced.

The configuration of base stations and UEs in FIG. 3 is shown as an example, and other examples are contemplated.

For example, one or more base stations illustrated in FIG. 3 may be replaced by one or more UEs that communicate via a UE-to-UE access network (e.g., a peer-to-peer network, a device-to-device network, and/or the like). In this case, an anchor node may refer to a UE that is directly in communication with a base station (e.g., an anchor base station or a non-anchor base station).

As indicated above, FIG. 3 is provided as an example. Other examples may differ from what is described with regard to FIG. 3.

Figure 4:
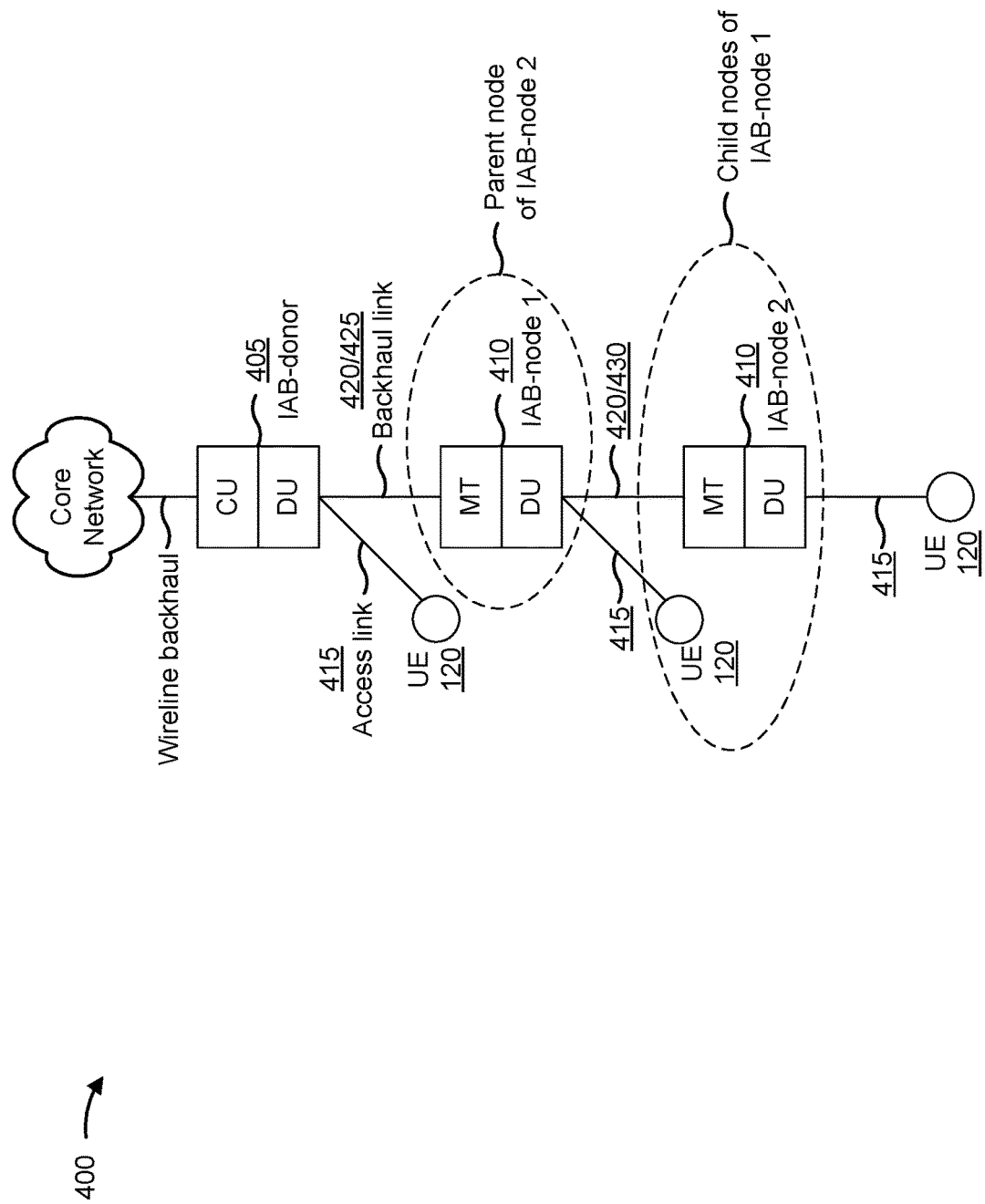
FIG. 4 is a diagram illustrating an example of an integrated access and backhaul (IAB) network architecture, in accordance with various aspects of the present disclosure.

FIG. 4 is a diagram illustrating an example 400 of an IAB network architecture, in accordance with various aspects of the disclosure.

As shown in FIG. 4, an IAB network may include an IAB donor 405 (shown as IAB-donor 405) that connects to a core network via a wired connection (shown as a wireline backhaul). For example, an Ng interface of an IAB donor 405 may terminate at a core network. Additionally, or alternatively, an IAB donor 405 may connect to one or more devices of the core network that provide an access and mobility management function (AMF). In some aspects, an IAB donor 405 may include a base station 110, such as an anchor base station, as described above in connection with FIG. 3. As shown, an IAB donor 405 may include a central unit (CU), which may perform access node controller (ANC) functions, AMF functions, and/or the like. The CU may configure a distributed unit (DU) of the IAB donor 405 and/or may configure one or more IAB nodes 410 (e.g., an MT and/or a DU of an IAB node 410) that connect to the core network via the IAB donor 405. Thus, a CU of an IAB donor 405 may control and/or configure the entire IAB network that connects to the core network via the IAB donor 405, such as by using control messages and/or configuration messages (e.g., a radio resource control (RRC) configuration message and/or the like). In some aspects, a control and/or configuration message may be carried via an F1 application protocol (F1-AP) interface. A CU may include RRC functionality and/or packet data convergence protocol (PDCP) functionality. A DU may include radio link control (RLC) functionality, medium access control (MAC) functionality, and/or physical (PHY) layer functionality.

As further shown in FIG. 4, the IAB network may include IAB nodes 410 (shown as IAB-node 1 and IAB-node 2) that connect to the core network via the IAB donor 405. As shown, an IAB node 410 may include mobile termination (MT) functions (sometimes also referred to as UE functions (UEF)), and may include DU functions (sometimes also referred to as access node functions (ANF)). The MT functions of an IAB node 410 (e.g., a child node) may be controlled and/or scheduled by another IAB node 410 (e.g., a parent node of the child node) and/or by an IAB donor 405. The DU functions of an IAB node 410 (e.g., a parent node) may control and/or schedule other IAB nodes 410 (e.g., child nodes of the parent node) and/or UEs 120. Thus, a DU may be referred to as a scheduling node or a scheduling component, and an MT may be referred to as a scheduled node or a scheduled component. In some aspects, an IAB donor 405 may include DU functions and not MT functions. That is, an IAB donor 405 may configure, control, and/or schedule communications of IAB nodes 410 and/or UEs 120. A UE 120 may include only MT functions, and not DU functions. That is, communications of a UE 120 may be controlled and/or scheduled by an IAB donor 405 and/or an IAB node 410 (e.g., a parent node of the UE 120).

When a first node controls and/or schedules communications for a second node (e.g., when the first node provides DU functions for the second node's MT functions), the first node may be referred to as a parent node of the second node, and the second node may be referred to as a child node of the first node. A child node of the second node may be referred to as a grandchild node of the first node. Thus, a DU function of a parent node may control and/or schedule communications for child nodes of the parent node. A parent node may be an IAB donor 405 or an IAB node 410, and a child node may be an IAB node 410 or a UE 120. Communications of an MT function of a child node may be controlled and/or scheduled by a parent node of the child node.

As further shown in FIG. 4, a link between a UE 120 (e.g., which only has MT functions, and not DU functions) and an IAB donor 405, or between a UE 120 and an IAB node 410, may be referred to as an access link 415. Access link 415 may be a wireless access link that provides a UE 120 with radio access to a core network via an IAB donor 405, and optionally via one or more IAB nodes 410. Thus, the network illustrated in FIG. 4 may be referred to as a wireless multi-hop network.

As further shown in FIG. 4, a link between an IAB donor 405 and an IAB node 410 or between two IAB nodes 410 may be referred to as a backhaul link 420. Backhaul link 420 may be a wireless backhaul link that provides an IAB node 410 with radio access to a core network via an IAB donor 405, and optionally via one or more other IAB nodes 410. In some aspects, a backhaul link 420 may be a primary backhaul link or a secondary backhaul link (e.g., a backup backhaul link). In some aspects, a secondary backhaul link may be used if a primary backhaul link fails, becomes congested, becomes overloaded, and/or the like. As used herein, a node or a wireless node may refer to an IAB donor 405 or an IAB node 410.

In an IAB network, network resources for wireless communications (e.g., time resources, frequency resources, spatial resources, and/or the like) may be shared between a parent link 425 of an IAB node 410 (shown as link 420/425 for IAB-node 1) and a child link 430 of the IAB node 410 (shown as link 420/430 for IAB-node 1). When an IAB node 410 uses time division multiplexing (TDM) between a parent link 425 and a child link 430, the IAB node 410 is subject to a half duplex constraint, meaning that the IAB node 410 cannot transmit and receive information at the same time (e.g., cannot concurrently communicate via a parent link 425 of the IAB node 410 and a child link 430 of the IAB node 410). This constraint may lead to high latency for communications.

To reduce latency, increase robustness, and expand coverage of an IAB network, the IAB network may be over-deployed. For example, there may be multiple IAB donors 405 and/or IAB nodes 410 with overlapping coverage, there may be multiple routes from a particular UE 120 and/or IAB node 410 to another IAB node and/or to the IAB donor 405, and/or the like. For example, because millimeter wave communications have high signal attenuation during propagation, IAB nodes 410 with overlapping coverage may be deployed to expand coverage in the IAB network and mitigate such signal attenuation. Furthermore, because millimeter wave communications are susceptible to link blockage and link failure, IAB nodes 410 with overlapping coverage may be deployed to improve robustness of the IAB network.

In some cases, to improve reliability of transmissions in an IAB network, packets may be transmitted to a destination (e.g., an IAB node, an IAB donor, a UE, and/or the like) along multiple paths. For example, PDCP duplication may be employed at the CU and/or the UE to improve reliability.

However, PDCP duplication results in large overhead. Some techniques and apparatuses described herein enable network coding to be used in an IAB network. Network coding improves reliability while using less resource overhead than PDCP duplication.

As indicated above, FIG. 4 is provided as an example. Other examples may differ from what is described with regard to FIG. 4.

Figure 5:
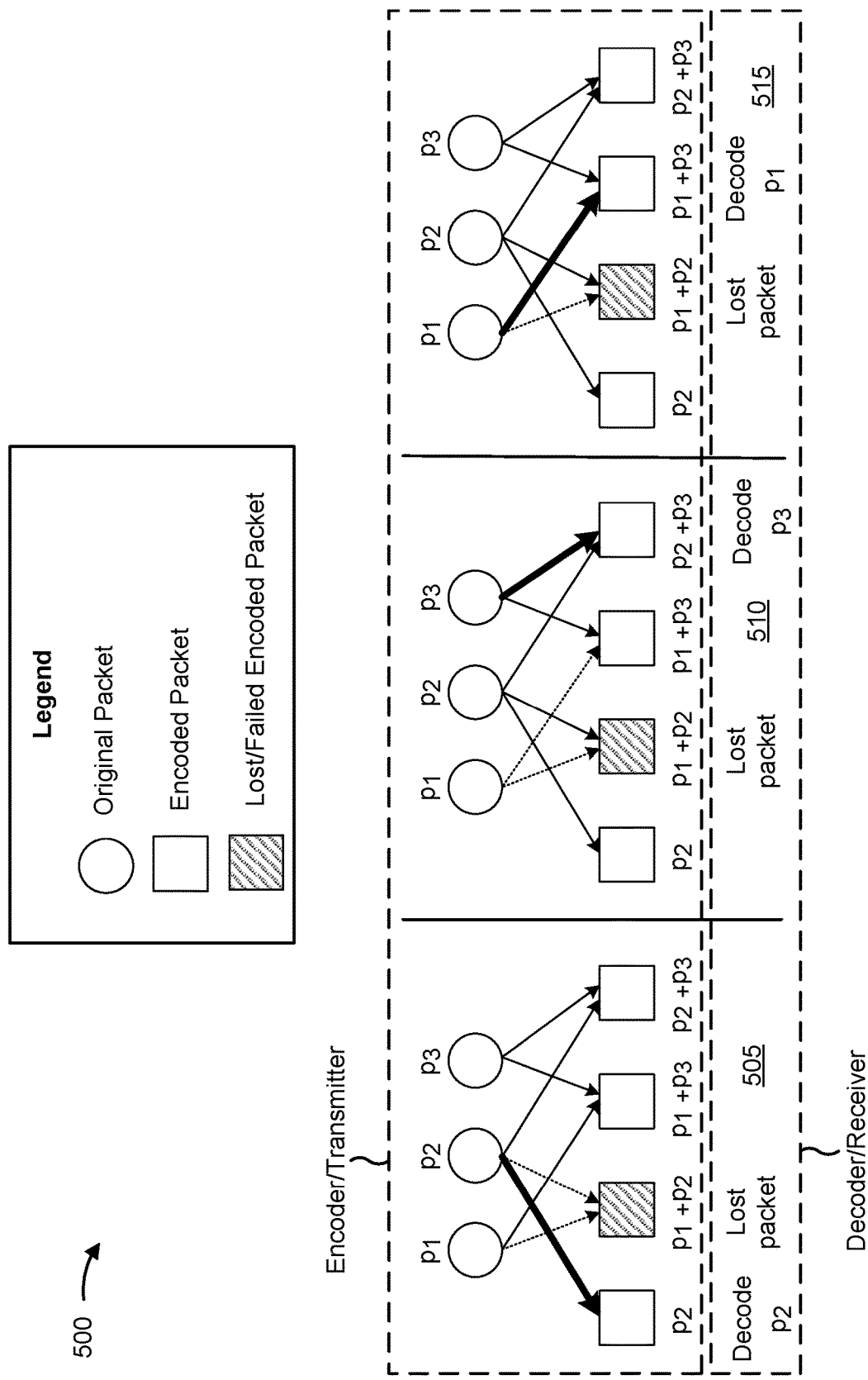
FIG. 5 is a diagram illustrating an example of network coding, in accordance with various aspects of the present disclosure.

FIG. 5 is a diagram illustrating an example 500 of network coding, in accordance with various aspects of the present disclosure.

As shown in FIG. 5, an encoder (or transmitter) may encode data, shown as a set of original packets (p1, p2, and p3), into a set of encoded packets using network coding. An encoded packet may be the same as an original packet, may be a redundancy version of an original packet, may include a combination of multiple original packets (e.g., a subset of the original packets), may include a redundancy version of the combination, and/or the like. The number of encoded packets may be the same as or different than the number of original packets. In example 500, the encoder encodes K original packets (where K=3) into N encoded packets (where N=4). The encoder transmits the encoded packets to a decoder (or receiver). The decoder uses network coding to decode the encoded packets and recover the original packets.

In example 500, the encoder encodes three original packets (p1, p2, and p3) into four encoded packets (that carry p2, p1+p2, p1+p3, and p2+p3, respectively) and transmits the four encoded packets to the decoder. The packet carrying p1+p2 is not successfully received by the decoder. In a first operation 505, the decoder decodes the packet carrying p2. In a second operation 510, the decoder obtains p3 from the packet containing p2+p3 because the decoder has already decoded p2 and can use combining to obtain p3 from p2+p3. In a third operation 515, the decoder obtains p1 from the packet containing p1+p3 because the decoder has already decoded p3 and can use combining to obtain p1 from p1+p3. In some aspects, an encoded packet may include an indication (e.g., in a header of the encoded packet) that indicates the original packet(s) that are included in the encoded packet. Thus, the decoder can obtain p1, p2, and p3 despite p1+p2 failing, and using less overhead than PDCP duplication. For example, PDCP duplication may duplicate all of the original packets for a total of six transmissions, while the example network coding shown in FIG. 5 uses four transmissions.

In some cases, the encoder may continue to transmit encoded packets (e.g., the same combination of encoded packets or different combinations of encoded packets) to the decoder until the encoder receives a notification from the decoder. For example, the decoder may successfully receive the original packets or may abort decoding, which may trigger the decoder to send a notification to the encoder. The notification may include, for example, an acknowledgement (ACK), a stop message (STOP), and/or the like. In some cases, the decoder may transmit an ACK for each original packet that is successfully received. Additionally, or alternatively, the decoder may transmit an ACK upon successful reception of all of the original packets. Upon receiving the notification, the encoder may encode additional data (e.g., a new set of original packets, such as p4, p5, and p6), and may transmit encoded packets to the decoder, in a similar manner as described above, until all of the data has been transmitted and/or successfully received.

In some cases, the encoder may perform inner coding to generate redundant packets from the original packets. A redundant packet may be a copy of an original packet or a redundancy version of an original packet. For example, the encoder may apply inner coding to generate K' original plus redundant packets from K original packets. The encoder may then perform outer coding to generate N encoded packets from the K' original plus redundant packets, in a similar manner as described above.

The encoder is sometimes also referred to as a transmitter, an encoder node, or a transmitter node. The encoder may include a UE 120, a base station 110, an IAB donor 405 (e.g., a CU user plane (CU-UP) function of an IAB donor 405, a DU of an IAB donor 405, and/or the like), an IAB node 410, and/or the like. The decoder is sometimes also referred to as a receiver, a decoder node, or a receiver node. The decoder may include a UE 120, a base station 110, an IAB donor 405 (e.g., a CU user plane (CU-UP) function of an IAB donor 405, a DU of an IAB donor 405, and/or the like), an IAB node 410, and/or the like.

As indicated above, FIG. 5 is provided as an example. Other examples may differ from what is described with respect to FIG. 5.

Figure 6:
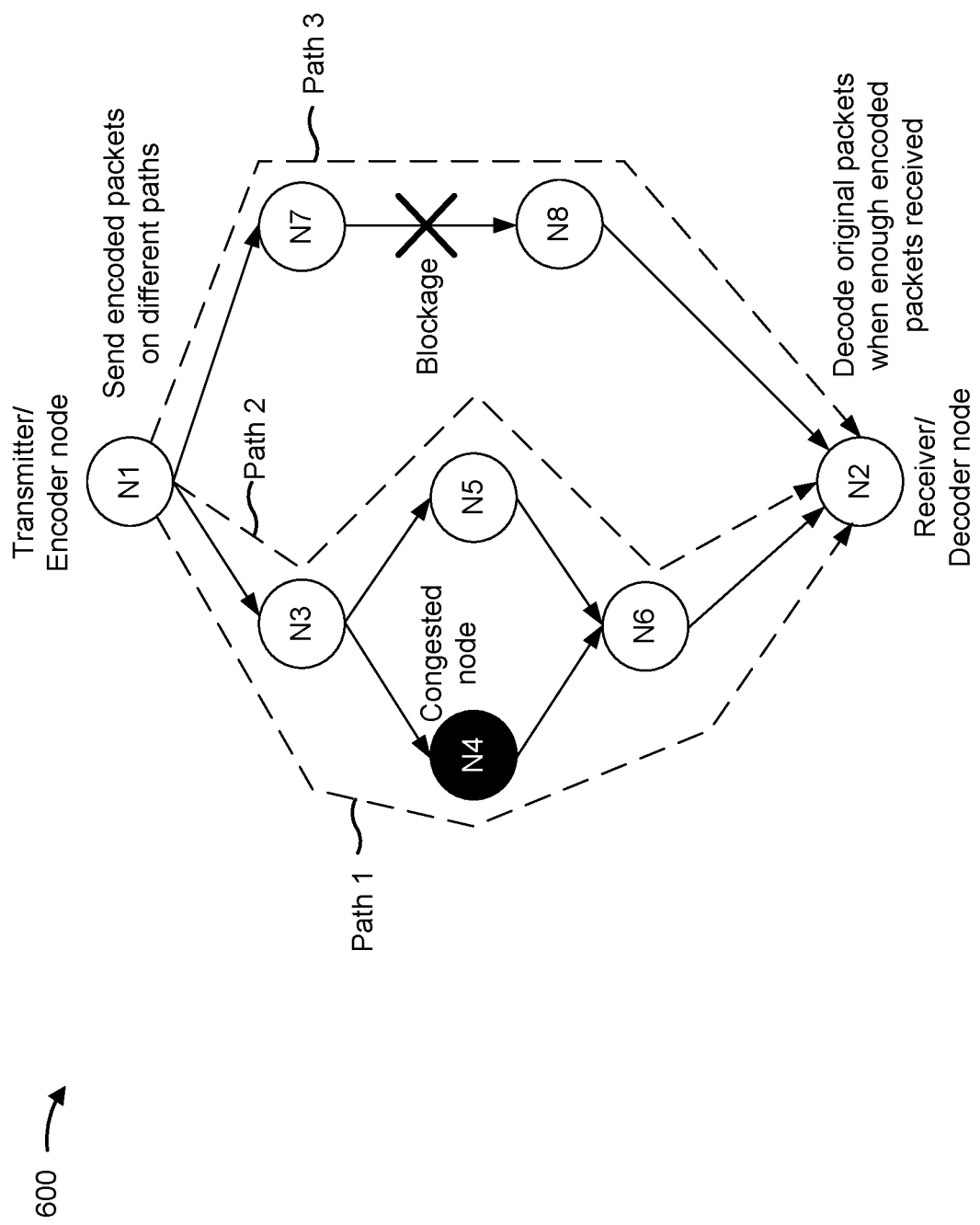
FIG. 6 is a diagram illustrating an example of multi-path transmission in a wireless multi-hop network, in accordance with various aspects of the present disclosure.

FIG. 6 is a diagram illustrating an example 600 of multi-path transmission in a wireless multi-hop network, in accordance with various aspects of the present disclosure.

As shown in FIG. 6, there may be multiple paths from an encoder node to a decoder node in a wireless multi-hop network (e.g., an IAB network), shown as Path 1, Path 2, and Path 3. A path may refer to a set of intermediate nodes, between the encoder node and the decoder node, via which information is transmitted from the encoder node to the decoder node. For example, a first path (Path 1) from the encoder node (N1) to the decoder node (N2) may include nodes N3, N4, and N6. A second path (Path 2) from the encoder node (N1) to the decoder node (N2) may include nodes N3, N5, and N6. A third path (Path 3) from the encoder node (N1) to the decoder node (N2) may include nodes N7 and N8.

In some cases, the encoder node may transmit all encoded packets (described above in connection with FIG. 5) along a single path. In some cases, the encoder node may transmit different encoded packets on different paths. For example, the encoder node may transmit a first encoded packet via Path 1, may transmit a second encoded packet via Path 2, may transmit a third encoded packet via Path 3, and/or the like. In some cases, the encoder may transmit packets via a path until the path fails (e.g., due to congestion at a node, a blockage, and/or the like, as shown). When a path fails, the encoder may refrain from transmitting encoded packets via that path, and may use one or more other paths. By using multiple paths, reliability of data transmission may be improved.

As indicated above, FIG. 6 is provided as an example. Other examples may differ from what is described with respect to FIG. 6.

Figure 7:
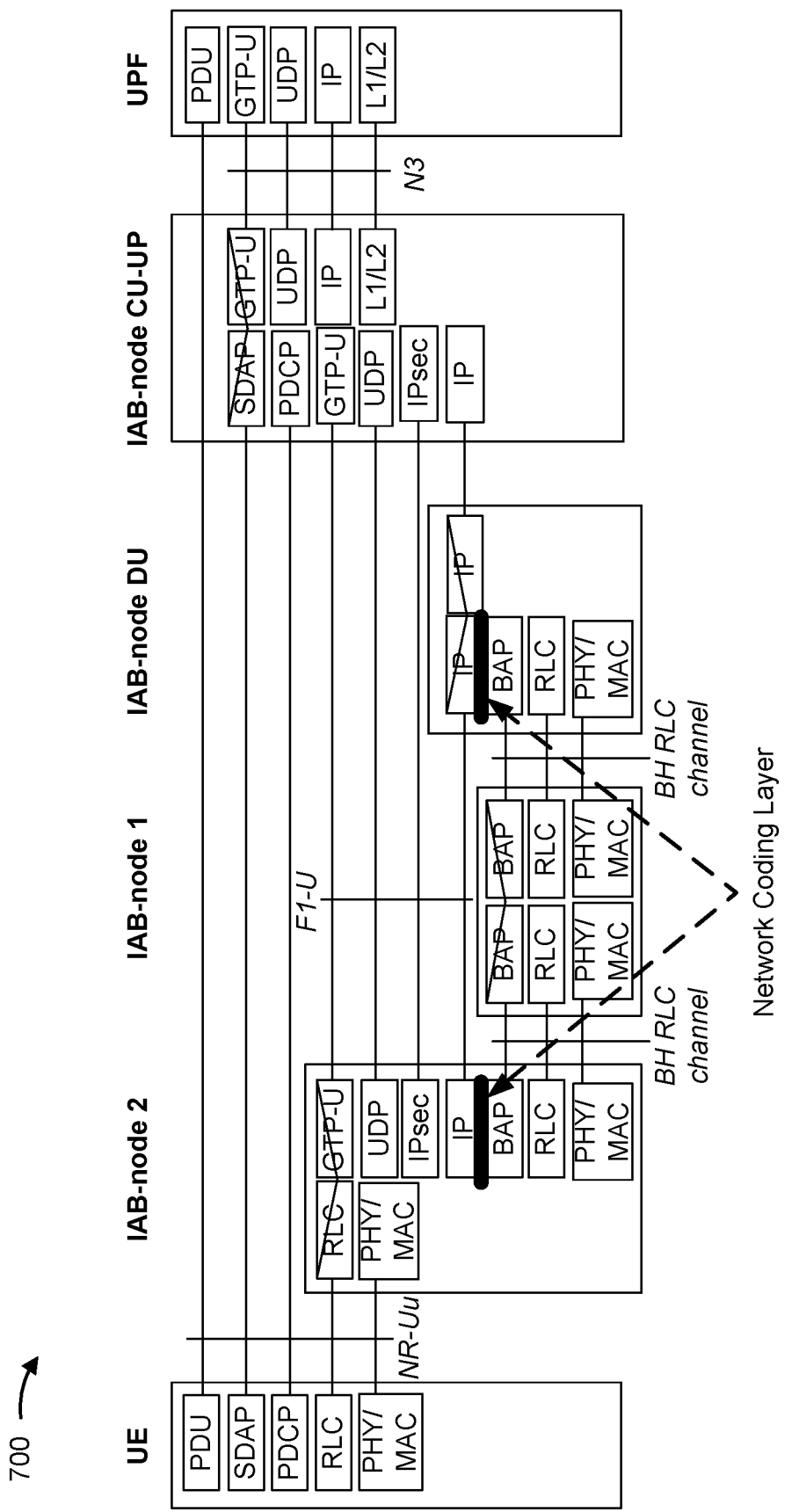
FIG. 7 is a diagram illustrating an example of network coding between an access IAB node and a distributed unit (DU) of an IAB donor, in accordance with various aspects of the present disclosure.

FIG. 7 is a diagram illustrating an example 700 of network coding between an access IAB node and a DU of an IAB donor, in accordance with various aspects of the present disclosure.

In example 700, network coding is performed below an Internet protocol (IP) layer and above a backhaul adaptation protocol (BAP) layer. In this case, the original packets are IP packets. Thus, K original IP packets may be encoded into N encoded packets. Different encoded packets may be assigned different BAP path identifiers. A BAP path identifier may correspond to or indicate a path via which an encoded packet, carrying the BAP path identifier, is to be transmitted from a transmitter or encoder to a receiver or decoder. The BAP layer may perform routing of packets through the IAB network. The receiver may decode the encoded packets using network coding, may reassemble the decoded packets, and may deliver the decoded packets to an upper layer (e.g., the IP layer in example 700).

In example 700, the network coding is performed between an IAB donor DU (e.g., a DU of an IAB donor) and an access IAB node. An access IAB node may refer to an IAB node in direct communication with a UE (e.g., an IAB node that transmits communications to the UE without the communications being transmitted to any intermediate IAB nodes between the UE and the IAB node, and that receives communications from the UE without the communications being received from any intermediate IAB nodes between the UE and the IAB node). The IP/BAP network coding in example 700 is performed between the IAB donor DU and the access IAB node because these nodes contain BAP layer functionality and IP layer functionality.

The network coding of example 700 is backward-compatible with legacy UEs and does not require any additional UE functionality because network coding is not performed at the UE. However, because the IAB donor DU is one endpoint for the network coding, and an IAB donor may include multiple IAB donor DUs, this type of network coding cannot be used for transmission of encoded packets via multiple paths that use different donor DUs of the IAB donor. Furthermore, because an access IAB node is the other endpoint for the network coding, this type of network coding cannot be used for transmission of encoded packets via multiple access IAB nodes, such as when the UE is dual-connected to two parent nodes (e.g., two access IAB nodes) or is multi-connected to multiple parent nodes.

As indicated above, FIG. 7 is provided as an example. Other examples may differ from what is described with respect to FIG. 7.

Figure 8:
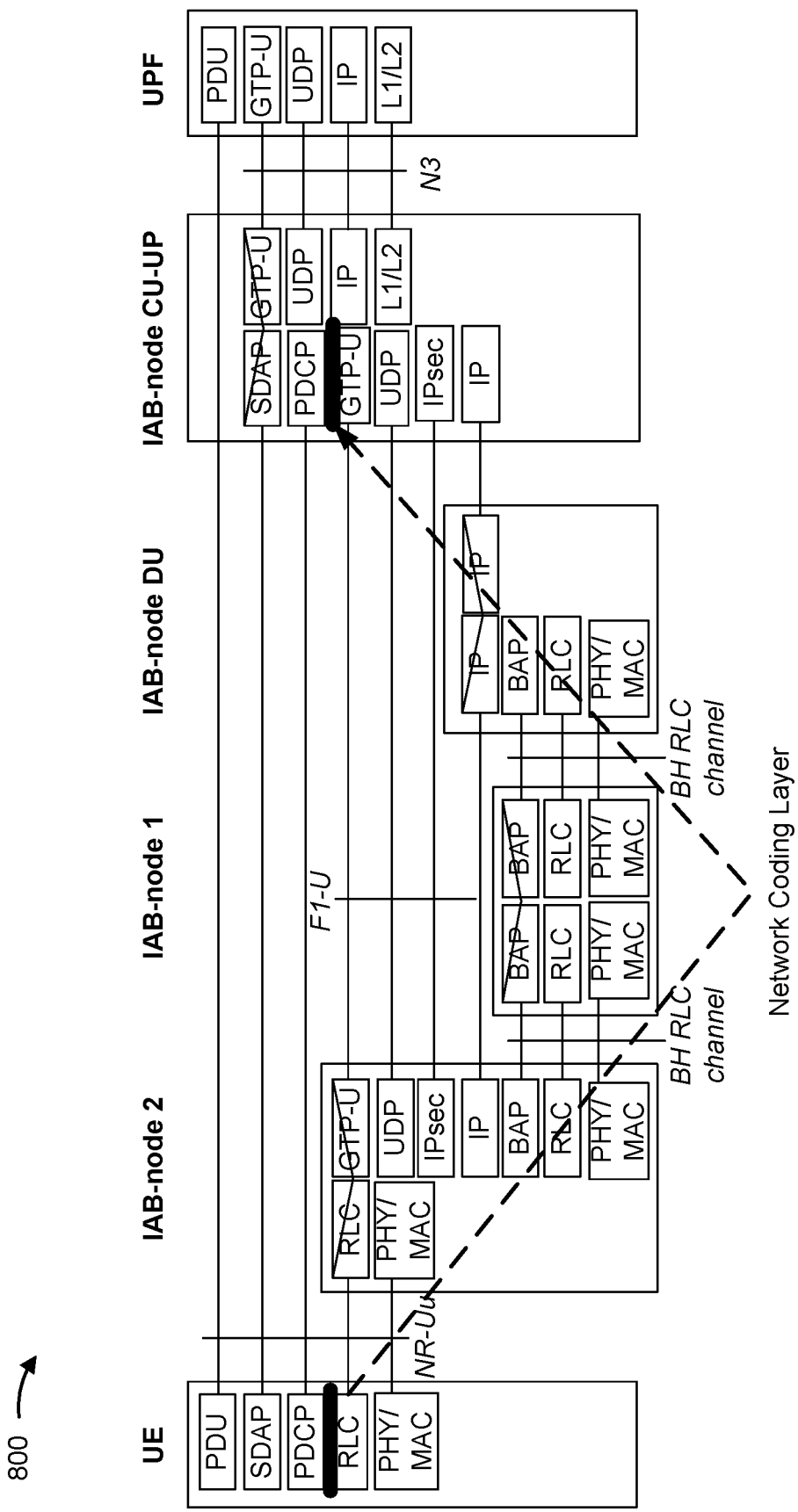
FIG. 8 is a diagram illustrating an example of network coding between a user equipment and a central unit (CU) of an IAB donor, in accordance with various aspects of the present disclosure.

FIG. 8 is a diagram illustrating an example 800 of network coding between a user equipment and a CU of an IAB donor, in accordance with various aspects of the present disclosure.

In example 800, network coding is performed below a PDCP layer and above an RLC layer of the UE or above a general packet radio service (GPRS) tunneling protocol (GTP) for user data (collectively, GTP-U) layer of the IAB donor (e.g., a CU of the IAB donor). In this case, the original packets are PDCP packets. Thus, K original PDCP packets may be encoded into N encoded packets. Different encoded packets may be assigned different GTP-U identifiers and/or RLC identifiers, and may traverse different paths between an IAB donor CU (e.g., a CU of the IAB donor) and the UE. The receiver may decode the encoded packets using network coding, may reassemble the decoded packets, and may deliver the decoded packets to an upper layer (e.g., the PDCP layer in example 800).

In example 800, the network coding is performed between an IAB donor CU (e.g., a user plane (UP) function of the IAB donor CU, or an IAB donor CU-UP) and a UE. The PDCP (e.g., PDCP/RLC and/or PDCP/GTP-U) network coding in example 800 is performed between the IAB donor CU-UP and the UE because these nodes contain PDCP layer functionality.

The network coding of example 800 permits transmission of encoded packets via multiple paths that use different donor DUs of the IAB donor because the IAB donor CU-UP is one endpoint for the network coding, and the IAB donor CU-UP may encode packets for transmission via different IAB donor DUs. Furthermore, this type of network coding permits transmission of encoded packets via multiple access IAB nodes, such as when the UE is dual-connected or multi-connected because the UE is the other endpoint for the network coding. However, the network coding of example 800 is not backward-compatible with legacy UEs because this type of network coding assumes additional UE functionality to be performed at the UE.

As indicated above, FIG. 8 is provided as an example. Other examples may differ from what is described with respect to FIG. 8.

Figure 9:
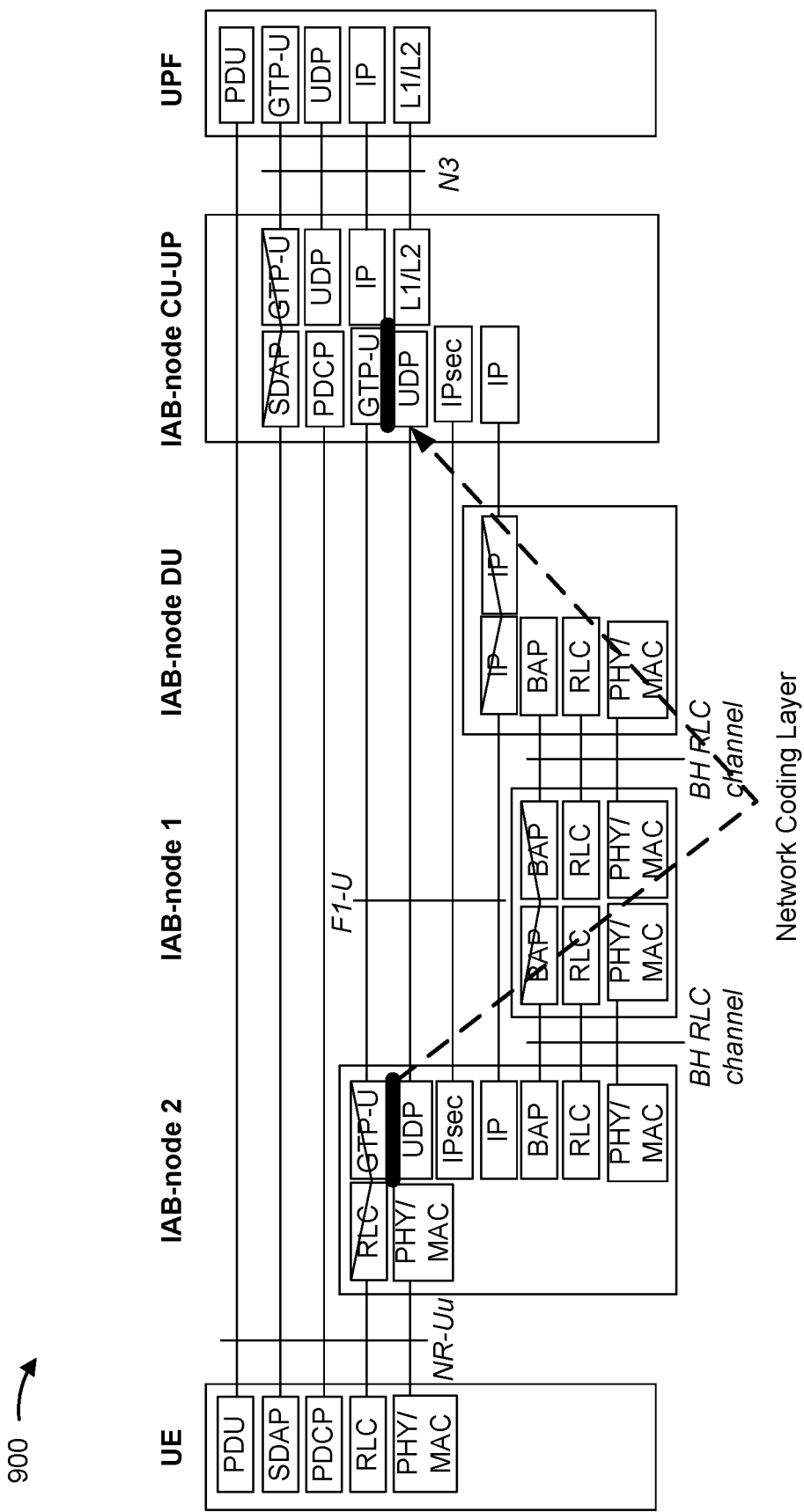
FIG. 9 is a diagram illustrating an example of network coding between an access IAB node and a CU of an IAB donor, in accordance with various aspects of the present disclosure.

FIG. 9 is a diagram illustrating an example 900 of network coding between an access IAB node and a CU of an IAB donor, in accordance with various aspects of the present disclosure.

In example 900, network coding is performed below a GTP-U layer and above a user datagram protocol (UDP) layer. In this case, the original packets are GTP-U packets. Thus, K original GTP-U packets may be encoded into N encoded packets. Different encoded packets may be assigned different GTP-U identifiers (e.g., IP addresses, transport network layer (TNL) addresses, and/or the like), and may traverse different paths between an IAB donor CU-UP and an access IAB node. The receiver may decode the encoded packets using network coding, may reassemble the decoded packets, and may deliver the decoded packets to an upper layer (e.g., the GTP-U layer in example 900).

In example 900, the network coding is performed between an IAB donor CU (e.g., an IAB donor CU-UP) and an access IAB node (e.g., an IAB node in direct communication with a UE). The GTP-U (e.g., GTP-U/UDP) network coding in example 900 is performed between the IAB donor CU-UP and the access IAB node because these nodes contain GTP-U layer functionality. The encoded packets may be transmitted via an F1-user plane (F1-U) interface between the IAB donor CU-UP and the access IAB node DU, such as by using GTP-U over UDP over IP.

The network coding of example 900 permits transmission of encoded packets via multiple paths that use different donor DUs of the IAB donor because the IAB donor CU-UP is one endpoint for the network coding, and the IAB donor CU-UP may encode packets for transmission via different IAB donor DUs. Furthermore, the network coding of example 900 is backward-compatible with legacy UEs because this type of network coding does not require additional UE functionality to be performed at the UE. However, this type of network coding does not permit transmission of encoded packets via multiple access IAB nodes, such as when the UE is dual-connected or multi-connected because the access IAB node is the other endpoint for the network coding.

In GTP-U, a tunnel endpoint identifier (TEID) may be used to identify a bearer (e.g., a radio bearer) and/or a flow associated with a UE, such as a bearer for voice calls, a bearer for data transmission, a bearer for video, and/or the like. A bearer may be associated with a set of quality of service (QoS) parameters that dictate a manner in which data traffic of the bearer is processed and/or transmitted.

For downlink or downstream communications (from the IAB donor to the UE), an IAB donor CU for the control plane (an IAB donor CU-CP) may receive (e.g., via an F1-AP interface) an IP address for the access IAB node DU associated with a bearer, and may indicate the IP address to the IAB donor CU-UP. The IAB donor CU-UP may transmit packets of the bearer using the IP address, and may use the TEID to indicate the bearer. The access IAB node may read the TEID from a GTP-U packet, and may use the TEID to map the packet to an RLC entity (e.g., a bearer, an RLC channel, and/or the like) for transmission to the UE in accordance with a set of QoS parameters associated with the RLC entity.

For uplink or upstream communications (from the UE to the IAB donor), the IAB node DU may receive (e.g., via an F1-AP interface) an IP address for the IAB donor CU-UP associated with a bearer. The access IAB node DU may transmit packets of the bearer using the IP address, and may use the TEID to indicate the bearer. The IAB donor CU-UP may read a TEID from the GTP-U packet, and may use the TED to map the packet to a PDCP entity and/or to determine the mapping of an RLC service data unit (SDU) to the bearer.

Currently, GTP-U uses a one-to-one mapping of TEIDs to paths (e.g., paths represented by IP addresses, by TNL addresses, and/or the like). In this case, each TEID is mapped to a single IP address or a single TNL address to define a transport bearer. As a result, packets associated with a particular TEID cannot be transmitted via multiple paths (e.g., corresponding to multiple IAB donor DUs). Some techniques and apparatuses described herein enable a one-to-many mapping of TEIDs to paths. In this case, each TEID can be mapped to multiple IP addresses and/or multiple TNL addresses, and can traverse different paths in the IAB network. A transmitter can use the same TED to identify encoded packets that are generated from the same set of original packets and that are transmitted via different paths. A receiver can use the TEID to identify encoded packets in a similar manner to enable the receiver to obtain and/or reassemble the original packets from the encoded packets. In this way, the network coding of example 900 can be used across multiple paths in an IAB network to reduce signaling overhead (e.g., as compared to PDCP duplication), improve reliability (e.g., due to spatial diversity achieved through transmission via multiple paths), and/or reduce latency without requiring new UE functionality. Furthermore, the one-to-many mapping of TEIDs (or other connection identifiers) to paths can be applied to other examples of network coding, such as example 700 of FIG. 7, example 800 of FIG. 8, and/or the like.

As indicated above, FIG. 9 is provided as an example. Other examples may differ from what is described with respect to FIG. 9.

Figure 10:
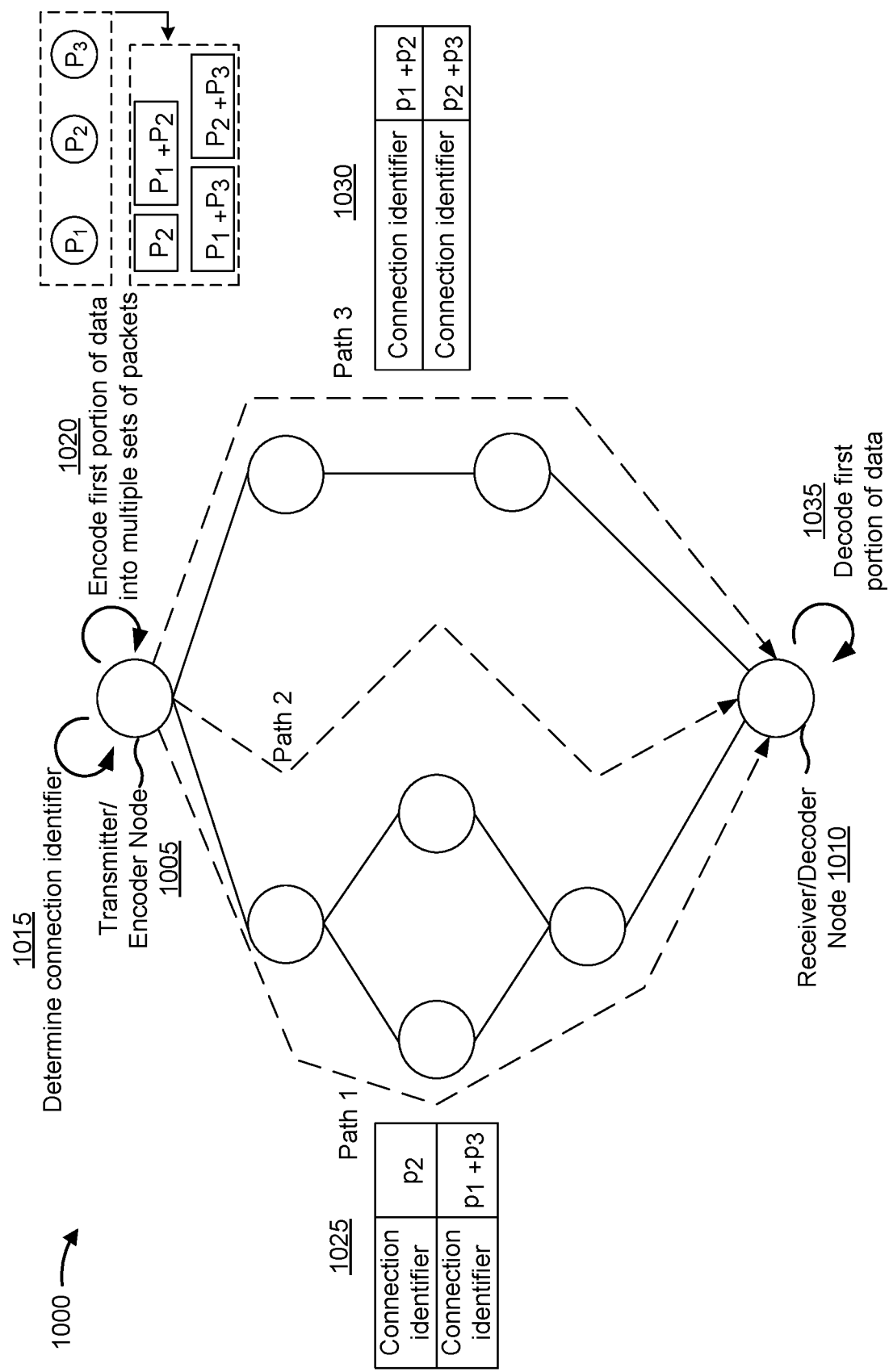
FIGS. 10 and 11 are diagrams illustrating examples of network coding in an IAB network, in accordance with various aspects of the present disclosure.

FIG. 10 is a diagram illustrating an example 1000 of network coding in an IAB network, in accordance with various aspects of the present disclosure.

As shown in FIG. 10, an encoder node 1005 (shown as a transmitter/encoder node) and a decoder node 1010 (shown as a receiver/decoder node) may communicate with one another. The encoder node 1005 may be referred to as a transmitter or a transmitter node in some aspects. The encoder node 1005 may include a network node of an IAB network. Additionally, or alternatively, the encoder node 1005 may include an IAB donor 405 (e.g., an IAB donor DU, an IAB donor CU, an IAB donor CU-UP, and/or the like), an IAB node 410 (e.g., an IAB node DU, an IAB node MT, an access IAB node, an access IAB node DU, and/or the like), a base station 110 (e.g., a DU of a base station 110, a CU of a base station 110, and/or the like), a UE 120, and/or the like. The decoder node 1010 may be referred to as a receiver or a receiver node in some aspects. Additionally, or alternatively, the decoder node 1010 may include an IAB donor 405 (e.g., an IAB donor DU, an IAB donor CU, an IAB donor CU-UP, and/or the like), an IAB node 410 (e.g., an IAB node DU, an IAB node MT, an access IAB node, an access IAB node DU, and/or the like), a base station 110 (e.g., a DU of a base station 110, a CU of a base station 110, and/or the like), a UE 120, and/or the like.

In some aspects, the encoder node 1005 may include one of an IAB donor DU or an access IAB node DU, and the decoder node 1010 may include the other of the IAB donor DU or the access IAB node DU, as described above in connection with example 700 of FIG. 7. In some aspects, the encoder node 1005 may include one of an IAB donor CU-UP or a UE, and the decoder node 1010 may include the other of the IAB donor CU-UP or the UE, as described above in connection with example 800 of FIG. 8. In some aspects, the encoder node 1005 may include one of an IAB donor CU-UP or an access IAB node DU, and the decoder node 1010 may include the other of the IAB donor CU-UP or the access IAB node DU, as described above in connection with example 900 of FIG. 9.

As shown by reference number 1015, the encoder node 1005 may determine a connection identifier. The connection identifier may be associated with or may enable transmission of data (e.g., encoded using network coding) to the decoder node 1010 in a wireless multi-hop network (e.g., an IAB network) via multiple paths. The connection identifier may be associated with a single UE radio bearer (e.g., between the UE and an access IAB node, which may be one of the encoder node 1005 or the decoder node 1010). For example, the connection identifier may be used to identify a UE bearer (e.g., a radio bearer, such as a data radio bearer, a dedicated radio bearer, and/or the like) within communications transmitted via the F1-U interface between an access IAB node and an IAB donor CU-UP. In some aspects, the connection identifier may be a TED, as described elsewhere herein. Additionally, or alternatively, the connection identifier may be an identifier included in a BAP header, an identifier included in a GTP-U header, an identifier included in a network coding header, and/or the like.

As described above in connection with FIG. 9, a single connection identifier may have a one-to-many mapping to paths in an IAB network. A path may be identified by a path identifier, such as an IP address, a TNL address, and/or the like. Thus, a single connection identifier may have a one-to-many mapping to path identifiers (e.g., IP addresses, TNL addresses, and/or the like). For example, the connection identifier determined by the encoder node 1005 may be associated with multiple path identifiers (e.g., that correspond to different paths between the encoder node 1005 and the decoder node 1010), such as multiple IP addresses, multiple TNL addresses, and/or the like. In some aspects, a path identifier may correspond to an IAB donor DU, and different path identifiers may correspond to different IAB donor DUs (e.g., of the same IAB donor).

In some aspects, the encoder node 1005 may receive an indication of the connection identifier in a configuration message. For example, the configuration message may include an RRC message, an F1-AP message, a BAP control message, a user plane protocol message (e.g., an NR user plane protocol message), and/or the like.

In some aspects, the encoder node 1005 may receive an indication of the path identifiers to be mapped to the connection identifier. For example, the encoder node 1005 (e.g., an IAB donor CU-UP) may receive an indication of the path identifiers from the encoder node 1010 (e.g., an access IAB node DU). Additionally, or alternatively, the encoder node 1005 may receive an indication of the path identifiers from a control node (e.g., an IAB donor CU-CP). In some aspects, the encoder node 1005 may receive an indication of the path identifiers from the encoder node 1010 via the control node. In some aspects, an IAB node DU may transmit a set of path identifiers associated with a bearer to the IAB donor CU-CP via an F1-AP interface. The IAB donor CU-CP may transmit all or a subset of the set of path identifiers (along with the connection identifier, in some aspects) to the IAB donor CU-UP via an E1 interface. Additionally, or alternatively, an IAB donor CU-UP may transmit a set of path identifiers (e.g., corresponding to different IAB donor DUs) to the IAB donor CU-CP via an F1-AP interface, and the IAB donor CU-CP may transmit all or a subset of the set of path identifiers (along with the connection identifier, in some aspects) to the access IAB node DU via an F1 control (F1-C) interface.

In some aspects, the encoder node 1005 may receive (e.g., from the decoder node 1010 and/or the control node) an indication of one or more weights to be applied to one or more path identifiers. In this case, when selecting a path identifier for a path via which a set of packets is to be transmitted, the encoder node 1005 may select the path identifier based at least in part on the one or more weights. For example, a path identifier associated with a higher priority weight may be selected more often or may be more likely to be selected than a path identifier associated with a lower priority weight. In some aspects, the IAB donor CU-CP and/or an access IAB node DU may dynamically modify and/or update the weights, such as to reflect a protection level to be assigned to a path, a reliability of a path, channel conditions along a path, and/or the like. In some aspects, the decoder node 1010 may transmit an indication of the one or more weights to the IAB donor CU-CP, and the IAB donor CU-CP may transmit the indication of the one or more weights to the encoder node 1005. Additionally, or alternatively, the IAB donor CU-CP may determine the one or more weights based at least in part on IAB network conditions, measurement reports associated with network nodes, buffer status reports associated with network nodes, and/or the like, and may indicate the one or more weights to the encode node 1005.

As shown by reference number 1020, the encoder node 1005 may encode a first portion of the data into at least a first set of (e.g., one or more) packets and a second set of (e.g., one or more) packets. The first portion of data may include a set of original packets. The first set of packets and/or the second set of packets may include a set of encoded packets, encoded from the original set of packets using network coding. The network coding may include, for example, linear network coding, fountain coding, and/or the like. In example 1000, the encoder node 1005 encodes a first portion of data, shown as original packets p1, p2, and p3, into encoded packets p2, p1+p2, p1+p3, and p2+p3, as described above in connection with FIG. 5. In example 1000, the first set of packets includes p2 and p1+p2, and the second set of packets includes p1+p3 and p2+p3. In some aspects, the first set of packets is different from the second set of packets. In some aspects, the first portion of the data is a first portion of GTP-U packets.

The encoder node 1005 may determine an encoder configuration, and may perform encoding according to the encoder configuration. The encoder configuration may indicate one or more parameters (e.g., one or more encoding parameters) that control a manner in which the encoding is performed. For example, the one or more parameters may include a seed value for encoding (e.g., a seed value to be used to initialize a random number generator used for encoding, such as for determining a linear combination for linear network coding), an initial encoder state for encoding (e.g., to initialize one or more values for the encoder), a segment size for segments of the first portion of the data and/or other portions of data (e.g., a size of each of K segments or K' segments), a number of segments to be included in the first portion of the data and/or other portions of data (e.g., a value of K and/or K' to be encoded into N encoded packets), interconnections between memory elements used for encoding (e.g., to define an encoder design, to define a manner in which encoder outputs are generated from encoder inputs, and/or the like), a parameter for a probability distribution used for encoding, a parameter for a polynomial generating function used for encoding, a number or a range of numbers of encoded packets to be included in the first set of packets, the second set of packets, and/or other sets of packets (e.g., a value or range of values for N), a code rate to be used for encoding, an indication of whether the encoding is to use rate-less encoding, a timer value associated with encoding and/or transmitting packets (e.g., for a timer that triggers the encoder node 1005 to stop transmitting packets when the timer expires), an indication of whether inner coding is used, and/or the like. The encoder configuration may be applied for inner coding and/or outer coding. In some aspects, the encoder configuration may be specific to a bearer and/or a connection identifier.

In some aspects, the encoder node 1005 may receive the encoder configuration from a control node, such as an IAB donor CU-CP (e.g., via an E1 interface). For example, the encoder node 1005 may receive the encoder configuration in a configuration message. In some aspects, the configuration message may explicitly indicate a parameter (or a set of parameters) by including a value for the parameter (or a set of values for the set of parameters) in the configuration message. Additionally, or alternatively, the configuration message may implicitly indicate a parameter by including an index value that maps to the parameter or a set of parameters. In some aspects, the encoder node 1005 may store a table that indicates an association between different index values and different sets of parameters of the encoder configuration. The table may be prespecified (e.g., according to a wireless communication standard) or may be indicated in a configuration message.

In some aspects, the encoder node 1005 may select the encoder configuration and/or one or more parameters of the encoder configuration. In this case, the encoder node 1005 may signal the selected encoder configuration and/or the selected one or more parameters to the control node (e.g., explicitly or implicitly, as described above). The control node and/or the encoder node 1005 may signal the encoder configuration and/or the one or more parameters to the decoder node 1010 to assist the decoder node 1010 with performing decoding. In this context, the encoder configuration may be referred to as a decoder configuration (e.g., because one or more parameters used by the encoder node 1005 for encoding may also be used by the decoder node 1010 for decoding). In some aspects, the decoding configuration may indicate a condition for aborting decoding (e.g., a timer value for an abort timer, a condition based at least in part on a number of received segments, and/or the like), a reporting configuration associated with transmitting decoding feedback, and/or the like. The reporting configuration may indicate, for example, a periodicity for reporting the decoding feedback, a condition for reporting the decoding feedback, a format for the decoding feedback (e.g., individual ACK/NACK for each original packet, collective ACK/NACK for all original packets, and/or the like), and/or the like. In some aspects, the condition for reporting the decoding feedback may be periodic and/or timer-based. In some aspects, the condition may be triggered by an event, such as arrival of a new encoded packet, a success or failure to recover some or all of the original packets, and/or the like.

In some aspects, the encoder configuration and/or the decoder configuration may be indicated in a configuration message. Additionally, or alternatively, the encoder node 1005 may indicate the encoder configuration, the decoder configuration, and/or the one or more parameters (e.g., explicitly or implicitly, as described above) to the decoder node 1010 in a set of packets transmitted to the decoder node 1010. For example, the encoder node 1005 may indicate the encoder configuration, the decoder configuration, and/or the one or more parameters in a header of a packet (e.g., on the F1-U interface).

In some aspects, the encoder node 1005 may transmit (e.g., to a control node) or receive (e.g., from a control node, the decoder node 1010, and/or the like) a request to modify the encoder configuration, to enable the encoder configuration, or to disable the encoder configuration. In some aspects, the request may be based at least in part on a triggering event. The triggering event may include, for example, feedback from the decoder node 1010 (e.g., feedback to the IAB donor CU-UP via an F1-U interface, feedback to the IAB donor CU-CP via an F1-C interface, and/or the like), a measurement report from a UE or an MT function of the decoder node 1010 and/or another network node (e.g., a measurement report indicating radio link failure), a buffer status report from a UE or the MT function of the decoder node 1010 and/or another network node (e.g., a buffer status report indicating congestion), an establishment, a release, or a modification of a radio bearer of the UE (e.g., the radio bearer associated with the connection identifier), a change to a network topology of the wireless multi-hop network (e.g., a change to a path between the encoder node 1005 and the decoder node 1010, establishment of a new path, removal of a path, and/or the like), and/or the like. In some aspects, when a request to modify the encoder configuration is transmitted or received, a new encoder configuration may be indicated. In some aspects, the encoder node 1005 may modify, enable, or disable encoding based at least in part on a message from a control node, the decoder node 1010, and/or the like. Similarly, the decoder node 1010 may modify, enable, or disable decoding based at least in part on a message from a control node, the encoder node 1005, and/or the like. In some aspects, if network coding is enabled, then RLC status reports may be disabled to conserve network resources and signaling overhead. For example, backhaul RLC channels may be configured to an unacknowledged mode (e.g., via RRC signaling, F1-AP signaling, and/or the like).

As shown by reference number 1025, the encoder node 1005 may transmit the first set of packets and the connection identifier to the decoder node 1010 via a first path in the wireless multi-hop network (shown as Path 1). As shown by reference number 1030, the encoder node 1005 may transmit the second set of packets and the connection identifier to the decoder node 1010 via a second path in the wireless multi-hop network (shown as Path 3). Path 1 and Path 3 are shown as examples of the first path and the second path, and a different combination of paths may be used as the first path and the second path in some aspects. Furthermore, the encoded packets may be divided into sets of packets in a different manner than shown in FIG. 10 (e.g., by including different packets in each set, by including a different number of packets in each set, and/or the like). Additionally, or alternatively, the encoded packets may be included in a different number of sets of packets than shown in FIG. 10 (e.g., three sets of packets, four sets of packets, and/or the like).

In some aspects, different paths correspond to different IP routes. For example, the first path and the second path may correspond to a first IP route and a second IP route, respectively. In some aspects, different paths correspond to different paths on a BAP layer. For example, the first path and the second path may correspond to a first path on the BAP layer and a second path on the BAP layer, respectively. In some aspects, different paths correspond to links on different cell groups. For example, the first path and the second path may correspond to a master cell group link and a secondary cell group link, respectively.

As shown by reference number 1035, the decoder node 1010 may decode (or attempt to decode) the first portion of the data based at least in part on the first set of packets and the second set of packets. For example, the decoder node 1010 may receive the first set of packets and the connection identifier via the first path, may receive the second set of packets and the connection identifier from the encoder node via the second path, and may decode the first portion of the data based at least in part on receiving the first set of packets and the second set of packets. In some aspects, the decoder node 1010 may determine that the first set of packets and the second set of packets relate to the first portion of the data by determining that the first set of packets and the second set of packets have the same connection identifier (e.g., in a header). In some aspects, the decoder node 1010 may determine the connection identifier in a similar manner as described above in connection with the encoder node 1005. In some implementations, the decoder node 1010 may transmit a response to the encoder node 1005 based at least in part on the decoding, as described in more detail below in connection with FIG. 11.

As indicated above, FIG. 10 is provided as an example. Other examples may differ from what is described with respect to FIG. 10.

Figure 11:
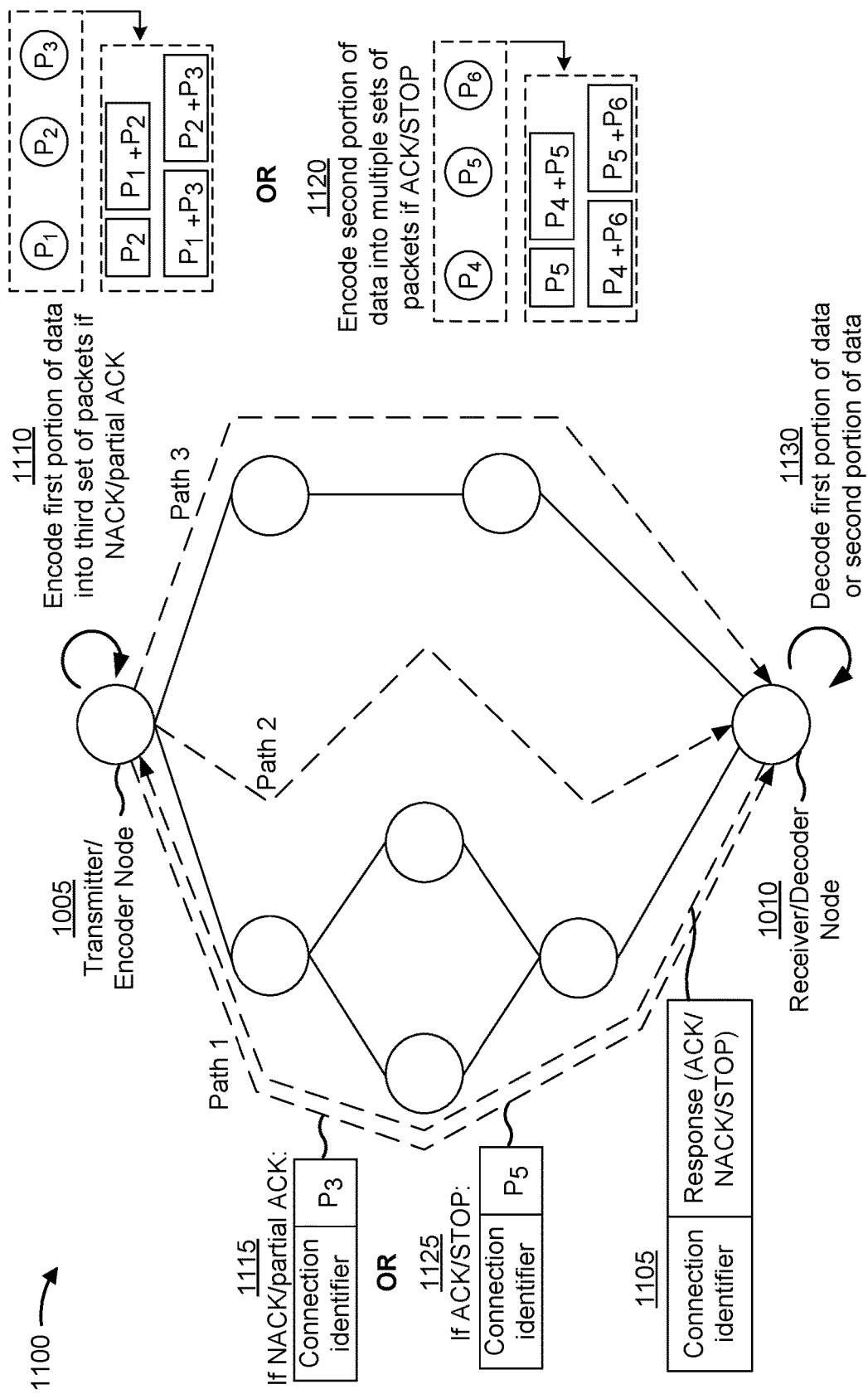

FIG. 11 is a diagram illustrating an example 1100 of network coding in an IAB network, in accordance with various aspects of the present disclosure.

As shown by reference number 1105, the decoder node 1010 may transmit a response to the encoder node 1005 based at least in part on a result of decoding the first portion of the data (described above in connection with reference number 1035 of FIG. 10). As shown, the response may include the connection identifier. In some aspects, if the decoder node 1010 successfully receives the first portion of the data (e.g., the original packets), then the response may include an ACK, a stop message (STOP), and/or the like. Alternatively, if the decoder node 1010 successfully receives the first portion of the data (e.g., the original packets), then the decoder node 1010 may refrain from transmitting a response (and the encoder node 1005 does expect a response upon successful decoding in such aspects). If the decoder node 1010 does not successfully receive the first portion of the data and/or receives only a subset of the original packets, then the response may include a negative acknowledgment (NACK), a partial ACK, and/or the like. The encoder node 1005 may receive the response and the connection identifier from the decoder node 1010.

As shown by reference number 1110, if the response includes a NACK or a partial ACK (and/or otherwise indicates that the first portion of data was not successfully received) the encoder node 1005 may encode a third set of packets from the first portion of the data. In some aspects, the third set of packets may be different from at least one of the first set of packets or the second set of packets (e.g., may be different from one or more sets of previously-encoded packets). The encoder node 1005 may encode the third set of packets in a similar manner as described above in connection with FIG. 10. For example, the third set of packets may be generated from the first portion of the data using network coding, such as linear network coding, fountain coding, and/or the like. As shown by reference number 1115, the encoder node 1005 may transmit the third set of packets and the connection identifier to the decoder node 1010. In some aspects, the encoder node 1005 may transmit the third set of packets via a path already used to transmit a previously-encoded set of packets (e.g., Path 1 or Path 3). Alternatively, the encoder node 1005 may transmit the third set of packets via a different path (e.g., Path 2). Although a third set of packets is described for simplicity, in some aspects, the encoder node 1005 may encode multiple sets of packets (e.g., the third set and one or more other sets) from the first portion of data, and may transmit the multiple sets of packets to the encoder node 1010 with the connection identifier (e.g., via multiple paths).

As shown by reference number 1120, if the response includes an ACK or a stop message (and/or otherwise indicates that the first portion of data was successfully received or aborted, such as if the decoder node 1010 is configured to not transmit a response upon successful decoding and the encoder node 1005 determines that a response has not been received after a threshold amount of time has elapsed) the encoder node 1005 may encode a second portion of data (e.g., a next portion of data after the first portion of data) into multiple sets of packets. The encoder node 1005 may encode the second portion of data into multiple sets of packets in a similar manner as described above in connection with FIG. 10. As shown by reference number 1125, the encoder node 1005 may transmit the multiple sets of packets and the connection identifier to the decoder node 1010. In some aspects, the encoder node 1005 may transmit different sets of the multiple sets of packets via different paths, in a similar manner as described above in connection with FIG. 10.

As shown by reference number 1130, the decoder node 1010 may decode the first portion of data or the second portion of data, depending on whether the encoder node 1005 transmitted the third set of packets (from the first portion of data) or the multiple sets of packets (from the second portion of data). For example, if the decoder node 1010 transmits a NACK or a partial ACK in the response, then the decoder node 1010 may receive the third set of packets, and may derive (or attempt to derive) the first portion of the data (e.g., from the first set of packets, the second set of packets, the third set of packets, and/or the like). If the decoder node 1010 transmits an ACK or a stop message in the response, then the decoder node 1010 may receive the multiple sets of packets generated from the second portion of data, and may derive (or attempt to derive) the second portion of the data from the multiple sets of packets. The encoder node 1005 and the decoder node 1010 may continue to operate in this manner until all original packets have been received by the decoder node 1010.

In some aspects, if the decoder node 1010 is configured to not transmit a response (e.g., an ACK or a STOP message) upon successfully decoding the first portion of data, the encoder node 1005 may be configured to transmit the first portion of data a threshold number of times (e.g., a threshold number of repetitions, which could use the same encoding or different encoding to encode the first portion of data into packets). In such aspects, the encoder node 1005 may transmit (e.g., repeat) the first portion of data the threshold number of times, and may then encode and transmit the second portion of data, as described above, if the encoder node 1005 does not receive a response from the decoder node 1010 (e.g., after a threshold amount of time has elapsed from the repeated transmissions). In some aspects, the encoder node 1005 may receive an encoder configuration that indicates the threshold number of times for repetition of the first portion of data. Additionally, or alternatively, the decoder node 1010 may receive a decoder configuration that indicates whether to transmit a response if data is successfully decoded (e.g., whether to refrain from transmitting or whether to transmit an ACK or STOP message).

In some aspects, the encoder node 1005 may be configured to transmit data in an unacknowledged mode. In such aspects, the encoder node 1005 may always transmit portions of data a threshold number of times without expecting a response, from the decoder node 1010, to such transmissions. After encoding and transmitting a first portion of data a threshold number of times, the encoder node 1005 may then encode and transmit a second portion of data the threshold number of times (in a similar manner as described above), and so on. In some aspects, the encoder node 1005 may receive an encoder configuration that indicates the threshold number of times for repetition of portions of data. In such aspects, the decoder node 1010 may be configured (e.g., via a decoder configuration) to refrain from transmitting a response regardless of the decoding result (e.g., successful decoding or unsuccessful decoding). This conserves signaling overhead of the response when the portions of data have a relatively high likelihood of being successfully received due to repeated transmissions.

As indicated above, FIG. 11 is provided as an example. Other examples may differ from what is described with respect to FIG. 11.

Figure 12:
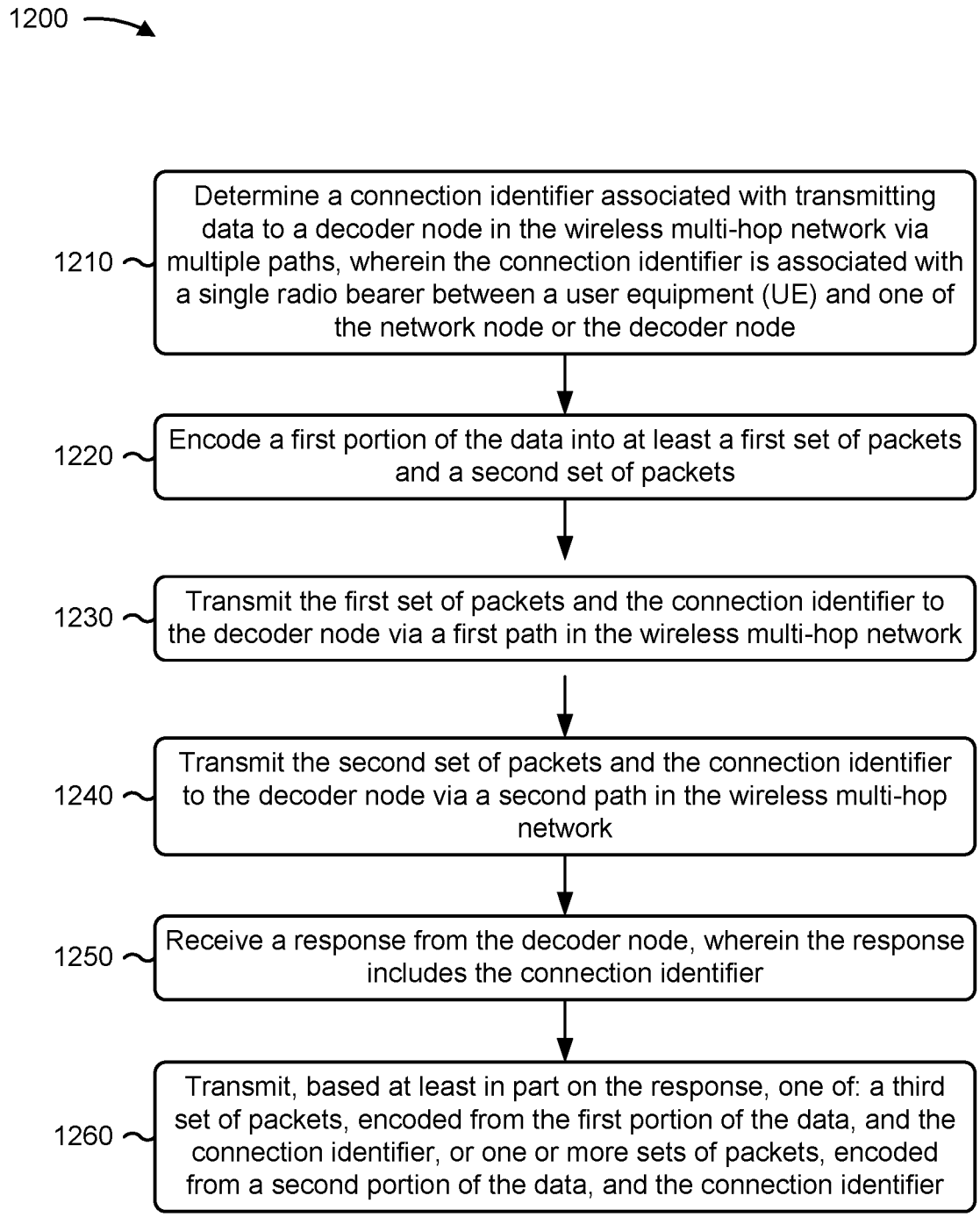
FIGS. 12 and 13 are diagrams illustrating example processes performed, for example, by a network node, in accordance with various aspects of the present disclosure.

FIG. 12 is a diagram illustrating an example process 1200 performed, for example, by a network node, in accordance with various aspects of the present disclosure. Example process 1200 is an example where the network node (e.g., base station 110, UE 120, IAB donor 405, IAB node 410, encoder node 1005, decoder node 1010, and/or the like) performs operations associated with network coding in an IAB network.

As shown in FIG. 12, in some aspects, process 1200 may include determining a connection identifier associated with transmitting data to a decoder node in the wireless multi-hop network via multiple paths, wherein the connection identifier is associated with a single radio bearer between a UE and one of the network node or the decoder node (block 1210). For example, the network node (e.g., using controller/processor 240, memory 242, communication unit 244, controller/processor 280, memory 282, controller/processor 290, memory 292, and/or the like) may determine a connection identifier associated with transmitting data to a decoder node in the wireless multi-hop network via multiple paths, as described above, for example, with reference to FIG. 10 and/or FIG. 11. In some aspects, the connection identifier is associated with a single radio bearer between a UE and one of the network node or the decoder node.

As further shown in FIG. 12, in some aspects, process 1200 may include encoding a first portion of the data into at least a first set of packets and a second set of packets (block 1220). For example, the network node (e.g., using controller/processor 240, memory 242, communication unit 244, transmit processor 220, TX MIMO processor 230, MOD 232, antenna 234, controller/processor 280, memory 282, transmit processor 264, TX MIMO processor 266, MOD 254, antenna 252, controller/processor 290, memory 292, communication unit 294, and/or the like) may encode a first portion of the data into at least a first set of packets and a second set of packets, as described above, for example, with reference to FIG. 10 and/or FIG. 11.

As further shown in FIG. 12, in some aspects, process 1200 may include transmitting the first set of packets and the connection identifier to the decoder node via a first path in the wireless multi-hop network (block 1230). For example, the network node (e.g., using controller/processor 240, memory 242, communication unit 244, transmit processor 220, TX MIMO processor 230, MOD 232, antenna 234, controller/processor 280, memory 282, transmit processor 264, TX MIMO processor 266, MOD 254, antenna 252, controller/processor 290, memory 292, communication unit 294, and/or the like) may transmit the first set of packets and the connection identifier to the decoder node via a first path in the wireless multi-hop network, as described above, for example, with reference to FIG. 10 and/or FIG. 11.

As further shown in FIG. 12, in some aspects, process 1200 may include transmitting the second set of packets and the connection identifier to the decoder node via a second path in the wireless multi-hop network (block 1240). For example, the network node (e.g., using controller/processor 240, memory 242, communication unit 244, transmit processor 220, TX MIMO processor 230, MOD 232, antenna 234, controller/processor 280, memory 282, transmit processor 264, TX MIMO processor 266, MOD 254, antenna 252, controller/processor 290, memory 292, communication unit 294, and/or the like) may transmit the second set of packets and the connection identifier to the decoder node via a second path in the wireless multi-hop network, as described above, for example, with reference to FIG. 10 and/or FIG. 11.

As further shown in FIG. 12, in some aspects, process 1200 may include receiving a response from the decoder node, wherein the response includes the connection identifier (block 1250). For example, the network node (e.g., using antenna 234, DEMOD 232, MIMO detector 236, receive processor 238, controller/processor 240, memory 242, communication unit 244, antenna 252, DEMOD 254, MIMO detector 256, receive processor 258, controller/processor 280, memory 282, controller/processor 290, memory 292, communication unit 294, and/or the like) may receive a response from the decoder node, as described above, for example, with reference to FIG. 10 and/or FIG. 11. In some aspects, the response includes the connection identifier.

As further shown in FIG. 12, in some aspects, process 1200 may include transmitting, to the decoder node and based at least in part on the response, one of: a third set of packets, encoded from the first portion of the data, and the connection identifier, or one or more sets of packets, encoded from a second portion of the data, and the connection identifier (block 1260). For example, the network node (e.g., using controller/processor 240, memory 242, communication unit 244, transmit processor 220, TX MIMO processor 230, MOD 232, antenna 234, controller/processor 280, memory 282, transmit processor 264, TX MIMO processor 266, MOD 254, antenna 252, controller/processor 290, memory 292, communication unit 294, and/or the like) may transmit, to the decoder node and based at least in part on the response, one of: a third set of packets, encoded from the first portion of the data, and the connection identifier, or one or more sets of packets, encoded from a second portion of the data, and the connection identifier, as described above, for example, with reference to FIG. 10 and/or FIG. 11.

Process 1200 may include additional aspects, such as any single aspect or any combination of aspects described below and/or in connection with one or more other processes described elsewhere herein.

In a first aspect, the connection identifier is associated with multiple Internet protocol (IP) addresses corresponding to the multiple paths, or multiple transport network layer (TNL) addresses corresponding to the multiple paths.

In a second aspect, alone or in combination with the first aspect, process 1200 includes receiving an indication of the multiple IP addresses or the multiple TNL addresses associated with the connection identifier.

In a third aspect, alone or in combination with one or more of the first and second aspects, process 1200 includes receiving an indication of multiple weights to be applied to the multiple IP addresses or the multiple TNL addresses associated with the connection identifier; and selecting a first IP address or a first TNL address, associated with the first path, based at least in part on the multiple weights; and selecting a second IP address or a second TNL address, associated with the second path, based at least in part on the multiple weights.

In a fourth aspect, alone or in combination with one or more of the first through third aspects, the connection identifier includes at least one of an identifier included in a backhaul adaptation protocol header, an identifier included in a general packet radio service tunneling protocol for user data (GTP-U) header, an identifier included in a network coding header, a tunnel endpoint identifier, or a combination thereof.

In a fifth aspect, alone or in combination with one or more of the first through fourth aspects, the first set of packets, the second set of packets, and the third set of packets are encoded from the first portion of the data using linear network coding or fountain coding.

In a sixth aspect, alone or in combination with one or more of the first through fifth aspects, the first set of packets is different from the second set of packets, and the third set of packets is different from at least one of the first set of packets or the second set of packets.

In a seventh aspect, alone or in combination with one or more of the first through sixth aspects, transmitting one of the third set of packets or the one or more sets of packets comprises transmitting the third set of packets based at least in part on a determination that the response includes a negative acknowledgment (NACK) or a partial acknowledgment (ACK).

In an eighth aspect, alone or in combination with one or more of the first through seventh aspects, transmitting one of the third set of packets or the one or more sets of packets comprises transmitting the one or more sets of packets encoded from the second portion of the data based at least in part on a determination that the response includes an ACK or a stop message indicating that the first portion of the data was successfully decoded or aborted.

In a ninth aspect, alone or in combination with one or more of the first through eighth aspects, the connection identifier is indicated in a configuration message.

In a tenth aspect, alone or in combination with one or more of the first through ninth aspects, the configuration message includes at least one of a radio resource control message, an F1 application protocol message, a backhaul adaptation protocol control message, or a user plane protocol message.

In an eleventh aspect, alone or in combination with one or more of the first through tenth aspects, the first path and the second path correspond to at least one of: a master cell group link and a secondary cell group link, a first path on a backhaul adaptation protocol layer and a second path on the backhaul adaptation protocol layer, or a first Internet protocol route and a second Internet protocol route.

In a twelfth aspect, alone or in combination with one or more of the first through eleventh aspects, the network node is a central unit of a base station, a distributed unit of a base station, a base station, the UE, an integrated access and backhaul (IAB) node, a mobile termination function of an IAB node, a distributed unit (DU) function of an IAB node, or a combination thereof.

In a thirteenth aspect, alone or in combination with one or more of the first through twelfth aspects, the network node is one of a central unit (CU) of an IAB donor or a DU of an IAB node in communication with the UE, and the decoder node is the other of the CU of the IAB donor or the DU of the IAB node in communication with the UE.

In a fourteenth aspect, alone or in combination with one or more of the first through thirteenth aspects, the first portion of the data is a first portion of general packet radio service tunneling protocol for user data (GTP-U) packets.

In a fifteenth aspect, alone or in combination with one or more of the first through fourteenth aspects, process 1200 includes determining an encoder configuration that indicates one or more parameters for the encoding, and encoding the first portion of the data further based at least in part on the encoder configuration.

In a sixteenth aspect, alone or in combination with one or more of the first through fifteenth aspects, the one or more parameters include at least one of a random seed value for the encoding, an initial encoder state for the encoding, a segment size for segments of the first portion of the data, a number of segments to be included in the first portion of the data, interconnections between memory elements used for the encoding, a parameter for a probability distribution or a polynomial generating function used for the encoding, a number or a range of numbers of encoded packets to be included in the first set of packets and the second set of packets, or a combination thereof.

In a seventeenth aspect, alone or in combination with one or more of the first through sixteenth aspects, the encoder configuration is received in a configuration message that includes at least one of one or more values for the one or more parameters, an index value that maps to the one or more parameters, or a combination thereof.

In an eighteenth aspect, alone or in combination with one or more of the first through seventeenth aspects, the encoder configuration is selected by the network node and signaled to a control node.

In a nineteenth aspect, alone or in combination with one or more of the first through eighteenth aspects, process 1200 includes transmitting an indication of the one or more parameters to the decoder node.

In a twentieth aspect, alone or in combination with one or more of the first through nineteenth aspects, process 1200 includes transmitting or receiving a request to modify the encoder configuration, enable the encoder configuration, or disable the encoder configuration based at least in part on a triggering event that includes at least one of: feedback from the decoder node, a measurement report from the UE or a mobile termination function of the decoder node or another network node, a buffer status report from the UE or the mobile termination function of the decoder node or another network node, an establishment, a release, or a modification of the single radio bearer or another radio bearer of the UE, a change to a network topology of the wireless multi-hop network, or a combination thereof.

In a twenty-first aspect, alone or in combination with one or more of the first through twentieth aspects, the request to modify the encoder configuration includes a new encoder configuration to be used for the encoding.

In a twenty-second aspect, alone or in combination with one or more of the first through twenty-first aspects, process 1200 includes enabling, disabling, or modifying the encoding based at least in part on a message received from a control node or the decoder node.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
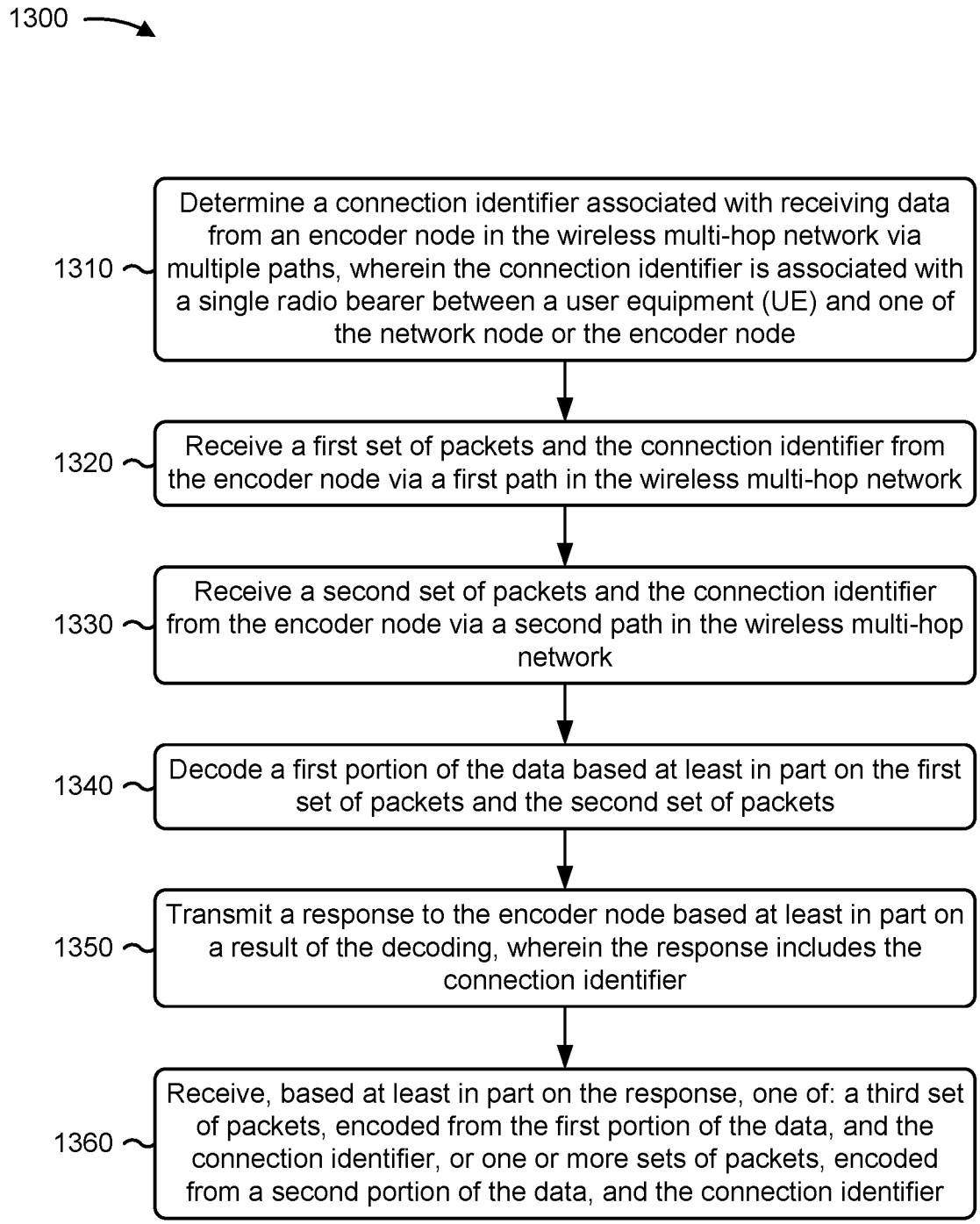

FIG. 13 is a diagram illustrating an example process 1300 performed, for example, by a network node, in accordance with various aspects of the present disclosure. Example process 1300 is an example where the network node (e.g., base station 110, UE 120, IAB donor 405, IAB node 410, encoder node 1005, decoder node 1010, and/or the like) performs operations associated with network coding in an IAB network.

As shown in FIG. 13, in some aspects, process 1300 may include determining a connection identifier associated with receiving data from an encoder node in the wireless multi-hop network via multiple paths, wherein the connection identifier is associated with a single radio bearer between a UE and one of the network node or the encoder node (block 1310). For example, the network node (e.g., using controller/processor 240, memory 242, communication unit 244, controller/processor 280, memory 282, controller/processor 290, memory 292, and/or the like) may determine a connection identifier associated with receiving data from an encoder node in the wireless multi-hop network via multiple paths, as described above, for example, with reference to FIG. 10 and/or FIG. 11. In some aspects, the connection identifier is associated with a single radio bearer between a UE and one of the network node or the encoder node.

As further shown in FIG. 13, in some aspects, process 1300 may include receiving a first set of packets and the connection identifier from the encoder node via a first path in the wireless multi-hop network (block 1320). For example, the network node ((e.g., using antenna 234, DEMOD 232, MIMO detector 236, receive processor 238, controller/processor 240, memory 242, communication unit 244, antenna 252, DEMOD 254, MIMO detector 256, receive processor 258, controller/processor 280, memory 282, controller/processor 290, memory 292, communication unit 294, and/or the like) may receive a first set of packets and the connection identifier from the encoder node via a first path in the wireless multi-hop network, as described above, for example, with reference to FIG. 10 and/or FIG. 11.

As further shown in FIG. 13, in some aspects, process 1300 may include receiving a second set of packets and the connection identifier from the encoder node via a second path in the wireless multi-hop network (block 1330). For example, the network node (e.g., using antenna 234, DEMOD 232, MIMO detector 236, receive processor 238, controller/processor 240, memory 242, communication unit 244, antenna 252, DEMOD 254, MIMO detector 256, receive processor 258, controller/processor 280, memory 282, controller/processor 290, memory 292, communication unit 294, and/or the like) may receive a second set of packets and the connection identifier from the encoder node via a second path in the wireless multi-hop network, as described above, for example, with reference to FIG. 10 and/or FIG. 11.

As further shown in FIG. 13, in some aspects, process 1300 may include decoding a first portion of the data based at least in part on the first set of packets and the second set of packets (block 1340). For example, the network node (e.g., using antenna 234, DEMOD 232, MIMO detector 236, receive processor 238, controller/processor 240, memory 242, communication unit 244, antenna 252, DEMOD 254, MIMO detector 256, receive processor 258, controller/processor 280, memory 282, controller/processor 290, memory 292, communication unit 294, and/or the like) may decode a first portion of the data based at least in part on the first set of packets and the second set of packets, as described above, for example, with reference to FIG. 10 and/or FIG. 11.

As further shown in FIG. 13, in some aspects, process 1300 may include transmitting a response to the encoder node based at least in part on a result of the decoding, wherein the response includes the connection identifier (block 1350). For example, the network node (e.g., using controller/processor 240, memory 242, communication unit 244, transmit processor 220, TX MIMO processor 230, MOD 232, antenna 234, controller/processor 280, memory 282, transmit processor 264, TX MIMO processor 266, MOD 254, antenna 252, controller/processor 290, memory 292, communication unit 294, and/or the like) may transmit a response to the encoder node based at least in part on a result of the decoding, as described above, for example, with reference to FIG. 10 and/or FIG. 11. In some aspects, the response includes the connection identifier.

As further shown in FIG. 13, in some aspects, process 1300 may include receiving, from the encoder node and based at least in part on the response, one of: a third set of packets, encoded from the first portion of the data, and the connection identifier, or one or more sets of packets, encoded from a second portion of the data, and the connection identifier (block 1360). For example, the network node (e.g., using antenna 234, DEMOD 232, MIMO detector 236, receive processor 238, controller/processor 240, memory 242, communication unit 244, antenna 252, DEMOD 254, MIMO detector 256, receive processor 258, controller/processor 280, memory 282, controller/processor 290, memory 292, communication unit 294, and/or the like) may receive, from the encoder node and based at least in part on the response, one of a third set of packets, encoded from the first portion of the data, and the connection identifier, or one or more sets of packets, encoded from a second portion of the data, and the connection identifier, as described above, for example, with reference to FIG. 10 and/or FIG. 11.

Process 1300 may include additional aspects, such as any single aspect or any combination of aspects described below and/or in connection with one or more other processes described elsewhere herein.

In a first aspect, the connection identifier is associated with multiple Internet protocol addresses corresponding to the multiple paths or multiple transport network layer addresses corresponding to the multiple paths.

In a second aspect, alone or in combination with the first aspect, process 1300 includes transmitting an indication of the multiple IP addresses or the multiple TNL addresses associated with the connection identifier.

In a third aspect, alone or in combination with one or more of the first and second aspects, process 1300 includes transmitting, to a control node, an indication of multiple weights to be applied to the multiple IP addresses or the multiple TNL addresses associated with the connection identifier.

In a fourth aspect, alone or in combination with one or more of the first through third aspects, the connection identifier includes at least one of an identifier included in a backhaul adaptation protocol header, an identifier included in a general packet radio service tunneling protocol for user data (GTP-U) header, an identifier included in a network coding header, a tunnel endpoint identifier, or a combination thereof.

In a fifth aspect, alone or in combination with one or more of the first through fourth aspects, the first portion of the data is derived from the first set of packets and the second set of packets using a decoding operation of a linear network code or a fountain code.

In a sixth aspect, alone or in combination with one or more of the first through fifth aspects, the first portion of the data is derived from the first set of packets, the second set of packets, and the third set of packets based at least in part on response including a NACK or a partial ACK.

In a seventh aspect, alone or in combination with one or more of the first through sixth aspects, the second portion of the data is derived from at least the one or more sets of packets based at least in part on the response including an ACK or a stop message indicating that the first portion of the data was successfully decoded or aborted.

In an eighth aspect, alone or in combination with one or more of the first through seventh aspects, the connection identifier is indicated in a configuration message.

In a ninth aspect, alone or in combination with one or more of the first through eighth aspects, the configuration message includes at least one of a radio resource control message, an F1 application protocol message, a backhaul adaptation protocol control message, or a user plane protocol message.

In a tenth aspect, alone or in combination with one or more of the first through ninth aspects, the first path and the second path correspond to at least one of: a master cell group link and a secondary cell group link, a first path on a backhaul adaptation protocol layer and a second path on the backhaul adaptation protocol layer, or a first Internet protocol route and a second Internet protocol route.

In an eleventh aspect, alone or in combination with one or more of the first through tenth aspects, the network node is a central unit of a base station, a distributed unit of a base station, a base station, the UE, an IAB node, a mobile termination function of an IAB node, a distributed unit function of an IAB node, or a combination thereof.

In a twelfth aspect, alone or in combination with one or more of the first through eleventh aspects, the network node is one of a CU of an IAB donor or a DU of an IAB node in communication with the UE, and the encoder node is the other of the CU of the IAB donor or the DU of the IAB node in communication with the UE.

In a thirteenth aspect, alone or in combination with one or more of the first through twelfth aspects, the first portion of the data is a first portion of GTP-U packets.

In a fourteenth aspect, alone or in combination with one or more of the first through thirteenth aspects, process 1300 includes receiving a decoder configuration that indicates one or more parameters for the decoding, and decoding the first portion of the data further based at least in part on the decoder configuration.

In a fifteenth aspect, alone or in combination with one or more of the first through fourteenth aspects, the one or more parameters include at least one of a random seed value for the decoding, an initial decoder state for the decoding, a segment size for segments of the first portion of the data, a number of segments in the first portion of the data, interconnections between memory elements used for the decoding, a parameter for a probability distribution or a polynomial generating function used for the decoding, a number or a range of numbers of encoded packets to be included in the first set of packets and the second set of packets, an indication of a condition for aborting the decoding, a reporting configuration associated with transmitting decoding feedback, or a combination thereof.

In a sixteenth aspect, alone or in combination with one or more of the first through fifteenth aspects, the reporting configuration indicates at least one of: a periodicity for reporting the decoding feedback, a condition for reporting the decoding feedback, a format for the decoding feedback, or a combination thereof.

In a seventeenth aspect, alone or in combination with one or more of the first through sixteenth aspects, the decoder configuration is received in a configuration message that includes at least one of one or more values for the one or more parameters, an index that maps to the one or more parameters, or a combination thereof.

In an eighteenth aspect, alone or in combination with one or more of the first through seventeenth aspects, the decoder configuration is received from the encoder node or a control node.

In a nineteenth aspect, alone or in combination with one or more of the first through eighteenth aspects, process 1300 includes enabling, disabling, or modifying the decoding based at least in part on a message received from the encoder node or a control node.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a network node in a wireless multi-hop network, comprising:
    determining a connection identifier associated with transmitting data to a decoder node in the wireless multi-hop network via multiple paths, wherein the connection identifier is associated with a single radio bearer between a user equipment (UE) and one of the network node or the decoder node;
    encoding a first portion of the data into at least a first set of packets and a second set of packets;
    transmitting the first set of packets and the connection identifier to the decoder node via a first path in the wireless multi-hop network;
    transmitting the second set of packets and the connection identifier to the decoder node via a second path in the wireless multi-hop network;
    receiving a response from the decoder node, wherein the response includes the connection identifier; and
    transmitting, to the decoder node and based at least in part on the response, one of:
        a third set of packets, encoded from the first portion of the data, and the connection identifier, or
        one or more sets of packets, encoded from a second portion of the data, and the connection identifier.

2. The method of claim 1, wherein the connection identifier is associated with multiple Internet protocol (IP) addresses corresponding to the multiple paths or multiple transport network layer (TNL) addresses corresponding to the multiple paths.

3. The method of claim 2, further comprising receiving an indication of the multiple IP addresses or the multiple TNL addresses associated with the connection identifier.

4. The method of claim 2, further comprising:
    receiving an indication of multiple weights to be applied to the multiple IP addresses or the multiple TNL addresses associated with the connection identifier; and selecting a first IP address or a first TNL address, associated with the first path, based at least in part on the multiple weights; and selecting a second IP address or a second TNL address, associated with the second path, based at least in part on the multiple weights.

5. The method of claim 1, wherein the connection identifier includes at least one of an identifier included in a backhaul adaptation protocol header, an identifier included in a general packet radio service tunneling protocol for user data (GTP-U) header, an identifier included in a network coding header, a tunnel endpoint identifier, or a combination thereof.

6. The method of claim 1, wherein the first set of packets, the second set of packets, and the third set of packets are encoded from the first portion of the data using linear network coding or fountain coding.

7. The method of claim 1, wherein the first set of packets is different from the second set of packets, and wherein the third set of packets is different from at least one of the first set of packets or the second set of packets.

8. The method of claim 1, wherein transmitting one of the third set of packets or the one or more sets of packets comprises transmitting the third set of packets based at least in part on a determination that the response includes a negative acknowledgment (NACK) or a partial acknowledgment (ACK).

9. The method of claim 1, wherein transmitting one of the third set of packets or the one or more sets of packets comprises transmitting the one or more sets of packets encoded from the second portion of the data based at least in part on a determination that the response includes an acknowledgment (ACK) or a stop message indicating that the first portion of the data was successfully decoded or aborted.

10. The method of claim 1, wherein the connection identifier is indicated in a configuration message.

11. The method of claim 10, wherein the configuration message includes at least one of a radio resource control message, an F1 application protocol message, a backhaul adaptation protocol control message, or a user plane protocol message.

12. The method of claim 1, wherein the first path and the second path correspond to at least one of:
a master cell group link and a secondary cell group link,
a first path on a backhaul adaptation protocol layer and a second path on the backhaul adaptation protocol layer, or
a first Internet protocol route and a second Internet protocol route.

13. The method of claim 1, wherein the first portion of the data is a first portion of general packet radio service tunneling protocol for user data (GTP-U) packets.

14. The method of claim 1, further comprising enabling, disabling, or modifying the encoding based at least in part on a message received from a control node or the decoder node.

15. A method of wireless communication performed by a network node in a wireless multi-hop network, comprising:
determining a connection identifier associated with receiving data from an encoder node in the wireless multi-hop network via multiple paths, wherein the connection identifier is associated with a single radio bearer between a user equipment (UE) and one of the network node or the encoder node;
receiving a first set of packets and the connection identifier from the encoder node via a first path in the wireless multi-hop network;
receiving a second set of packets and the connection identifier from the encoder node via a second path in the wireless multi-hop network;
decoding a first portion of the data based at least in part on the first set of packets and the second set of packets;
transmitting a response to the encoder node based at least in part on a result of the decoding, wherein the response includes the connection identifier; and
receiving, from the encoder node and based at least in part on the response, one of:
a third set of packets, encoded from the first portion of the data, and the connection identifier, or
one or more sets of packets, encoded from a second portion of the data, and the connection identifier.

16. The method of claim 15, wherein the connection identifier is associated with multiple Internet protocol addresses corresponding to the multiple paths or multiple transport network layer addresses corresponding to the multiple paths.

17. The method of claim 16, further comprising transmitting an indication of the multiple IP addresses or the multiple TNL addresses associated with the connection identifier.

18. The method of claim 16, further comprising transmitting, to a control node, information that permits the control node to determine multiple weights to be applied to the multiple IP addresses or the multiple TNL addresses associated with the connection identifier.

19. The method of claim 15, wherein the connection identifier includes at least one of an identifier included in a backhaul adaptation protocol header, an identifier included in a general packet radio service tunneling protocol for user data (GTP-U) header, an identifier included in a network coding header, a tunnel endpoint identifier, or a combination thereof.

20. The method of claim 15, wherein the first portion of the data is derived from the first set of packets and the second set of packets using a decoding operation of a linear network code or a fountain code.

21. The method of claim 15, wherein the first portion of the data is derived from the first set of packets, the second set of packets, and the third set of packets based at least in part on response including a negative acknowledgment (NACK) or a partial acknowledgment (ACK).

22. The method of claim 15, wherein the second portion of the data is derived from at least the one or more sets of packets based at least in part on the response including an acknowledgment (ACK) or a stop message indicating that the first portion of the data was successfully decoded or aborted.

23. The method of claim 15, wherein the connection identifier is indicated in a configuration message.

24. The method of claim 23, wherein the configuration message includes at least one of a radio resource control message, an F1 application protocol message, a backhaul adaptation protocol control message, or a user plane protocol message.

25. The method of claim 15, wherein the first path and the second path correspond to at least one of:
a master cell group link and a secondary cell group link,
a first path on a backhaul adaptation protocol layer and a second path on the backhaul adaptation protocol layer, or
a first Internet protocol route and a second Internet protocol route.

26. The method of claim 15, wherein the network node is a central unit of a base station, a distributed unit of a base station, a base station, the UE, an integrated access and backhaul (IAB) node, a mobile termination function of an IAB node, a distributed unit function of an IAB node, or a combination thereof.

27. The method of claim 15, wherein the first portion of the data is a first portion of general packet radio service tunneling protocol for user data (GTP-U) packets.

28. The method of claim 15, further comprising enabling, disabling, or modifying the decoding based at least in part on a message received from the encoder node or a control node.

29. A network node in a wireless multi-hop network for wireless communication, comprising:
   a memory; and
   one or more processors operatively coupled to the memory, the memory and the one or more processors configured to:
      determine a connection identifier associated with transmitting data to a decoder node in the wireless multi-hop network via multiple paths, wherein the connection identifier is associated with a single radio bearer between a user equipment (UE) and one of the network node or the decoder node;
      encode a first portion of the data into at least a first set of packets and a second set of packets;
      transmit the first set of packets and the connection identifier to the decoder node via a first path in the wireless multi-hop network;
      transmit the second set of packets and the connection identifier to the decoder node via a second path in the wireless multi-hop network;
      receive a response from the decoder node, wherein the response includes the connection identifier; and
      transmit, to the decoder node and based at least in part on the response, one of:
         a third set of packets, encoded from the first portion of the data, and the connection identifier, or
         one or more sets of packets, encoded from a second portion of the data, and the connection identifier.

30. A network node in a wireless multi-hop network for wireless communication, comprising:
   a memory; and
   one or more processors operatively coupled to the memory, the memory and the one or more processors configured to:
      determine a connection identifier associated with receiving data from an encoder node in the wireless multi-hop network via multiple paths, wherein the connection identifier is associated with a single radio bearer between a user equipment (UE) and one of the network node or the encoder node;
      receive a first set of packets and the connection identifier from the encoder node via a first path in the wireless multi-hop network;
      receive a second set of packets and the connection identifier from the encoder node via a second path in the wireless multi-hop network;
      decode a first portion of the data based at least in part on the first set of packets and the second set of packets;
      transmit a response to the encoder node based at least in part on a result of the decoding, wherein the response includes the connection identifier; and
      receive, from the encoder node and based at least in part on the response, one of:
         a third set of packets, encoded from the first portion of the data, and the connection identifier, or
         one or more sets of packets, encoded from a second portion of the data, and the connection identifier.

* * * * *